United States Patent
Yamahara

(10) Patent No.: US 6,535,258 B1
(45) Date of Patent: Mar. 18, 2003

(54) LIQUID CRYSTAL DISPLAY DEVICE WITH LOW DISPERSION LC AND HIGH DISPERSION COMPENSATOR

(75) Inventor: Motohiro Yamahara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/597,520

(22) Filed: Jun. 20, 2000

Related U.S. Application Data

(62) Division of application No. 09/056,035, filed on Apr. 6, 1998, now Pat. No. 6,137,556.

(30) Foreign Application Priority Data

Apr. 7, 1997 (JP) .............................................. 9-88541

(51) Int. Cl.⁷ ............................................ G02F 1/1335
(52) U.S. Cl. ...................................... 349/118; 349/177
(58) Field of Search ................................ 349/117, 118, 349/119, 120, 177

(56) References Cited

U.S. PATENT DOCUMENTS

| | | | |
|---|---|---|---|
| 4,291,948 A | 9/1981 | Crossland et al. | 349/125 |
| 4,844,569 A | 7/1989 | Wada et al. | 349/117 |
| 4,909,606 A | 3/1990 | Wada et al. | 349/117 |
| 5,011,268 A | 4/1991 | Kaganowicz | 349/125 |
| 5,013,139 A | 5/1991 | Kaganowicz et al. | 349/125 |
| 5,119,216 A | 6/1992 | Wada et al. | 349/76 |

(List continued on next page.)

FOREIGN PATENT DOCUMENTS

| | | |
|---|---|---|
| DE | 19519928 | 12/1995 |
| EP | 0576304 | 12/1993 |
| EP | 0667553 | 8/1995 |
| EP | 0676660 | 10/1995 |

(List continued on next page.)

OTHER PUBLICATIONS

Wu, "Phase–Matched Baxial Compensation Film for LCDs", SID 1995 Dig, pp. 555–558, May 1995.*

Nishimura et al, "The performance of a Liquid–Crystal Polymer Film as an Optical Compensator for a Fast–Response STN–LCD" SID '95.*

Herke et al, "LCD Modeling as a Display Characterization Tool", SID '95.*

Wu, "Phase–matched compensation films for liquid crystal displays", MAterials Chemistry and Physics 1995.*

*Primary Examiner*—Kenneth Parker
(74) *Attorney, Agent, or Firm*—Dike, Bronstein, Roberts & Cushman IP Group; David G. Conlin; David A. Tucker

(57) ABSTRACT

The liquid crystal display device is composed of at least one optical retardation compensator plate 2 (and 3) inserted between a liquid crystal display element 1 and polarizer plates 4 and 5. The liquid crystal display element 1 is composed of a pair of electrode substrates 6 and 7 and a liquid crystal layer 8 sealed therebetween. The polarizer plates 4 and 5 flank the liquid crystal display element 1. The optical retardation compensator plate 2 (and 3) has a negative refractive index anisotropy (na=Nc>nb). The direction of a principal refractive index nb parallel to the normal to the surface and the direction of either a principal refractive index na or nc in the surface incline either clockwise or counterclockwise around the direction of the principal refractive index nc or na in the surface. Moreover, either the pretilt angle formed by the orientation films 11 and 14 and the longer axes of liquid crystal molecules in the liquid crystal layer or the value of applied voltage for displaying halftone obtained by applying to the liquid crystal a voltage that is close to the threshold voltage for the liquid crystal is set within such a range that tone reversion does not occur in the opposite viewing direction when halftone is being displayed.

17 Claims, 11 Drawing Sheets

U.S. PATENT DOCUMENTS

| | | | |
|---|---|---|---|
| 5,280,375 A | 1/1994 | Tsuda et al. | 349/128 |
| 5,499,126 A | 3/1996 | Abileah et al. | 349/106 |
| 5,504,603 A | 4/1996 | Winker et al. | 349/117 |
| 5,550,661 A | 8/1996 | Clark et al. | 349/117 |
| 5,583,679 A | 12/1996 | Ito et al. | 349/118 |
| 5,583,680 A | 12/1996 | Nakamura et al. | 349/172 |
| 5,589,963 A | 12/1996 | Gunning, III et al. | 349/118 |
| 5,619,352 A | 4/1997 | Koch et al. | 349/117 |
| 5,657,140 A * | 8/1997 | Xu et al. | 349/118 |
| 5,760,859 A * | 6/1998 | Bosma et al. | 349/75 |
| 5,777,709 A * | 7/1998 | Xu | 349/120 |
| 5,793,455 A * | 8/1998 | Nakamura | 349/96 |

FOREIGN PATENT DOCUMENTS

| | | |
|---|---|---|
| JP | 55-600 | 1/1980 |
| JP | 56-97318 | 8/1981 |
| JP | 57-186735 | 11/1982 |
| JP | 4-044010 | 2/1992 |
| JP | 5-215912 | 8/1993 |
| JP | 5-313159 | 11/1993 |
| JP | 6-75116 | 3/1994 |
| JP | 6-118406 | 4/1994 |
| JP | 6-194645 | 7/1994 |
| JP | 07152028 | 6/1995 |
| JP | 8-050206 | 2/1996 |
| JP | 8-101381 | 4/1996 |
| WO | WO 95/09379 | 4/1995 |
| WO | WO 96/10772 | 4/1996 |

* cited by examiner

LIQUID CRYSTAL DISPLAY DEVICE WITH LOW DISPERSION LC AND HIGH DISPERSION COMPENSATOR

This application is a divisional of U.S. application Ser. No. 09/056,035, filed Apr. 6, 1998, now allowed U.S. Pat. No. 6,137,556, the teachings of which are incorporated herein by reference.

FIELD OF THE INVENTION

The present invention relates to a liquid crystal display device, especially, to a liquid crystal display device with the viewing angle dependency of the display screen abated by a combination of a liquid crystal display element and an optical retardation compensator plate.

BACKGROUND OF THE INVENTION

Conventionally, liquid crystal display devices incorporating nematic liquid crystal display elements have been in widespread use for numeral-segment-type display devices such as watches and calculators, and recently the applications are finding more places with word processors, notebook-type personal computers, liquid crystal televisions mounted in automobiles, etc.

Generally, a liquid crystal display element has a transparent substrate, electrode lines for turning on and off pixels, and other components formed on the substrate. For example, in an active-matrix type liquid crystal display device, active elements, such as thin-film transistors, are formed on the substrate together with the electrode lines as switching means for selectively driving pixel electrodes by which voltages are applied across the liquid crystal. Moreover, in liquid crystal display devices capable of color display, color filter layers having colors such as red, green and blue are provided on the substrate.

Liquid crystal display elements such as the one mentioned above adopt a liquid crystal display mode that is suitably selected depending on the twisted angle of the liquid crystal: some of well-known modes are active-driving-type twisted nematic liquid crystal display mode (hereinafter, referred to as the TN mode) and the multiplex-driving-type super-twisted nematic liquid crystal display mode (hereinafter, referred to as the STN mode).

The TN mode displays images by orientating the nematic liquid crystal molecules to a 90°-twisted state so as to direct rays along the twisted directions. The STN mode utilizes the fact that the transmittance is allowed to change abruptly in the vicinity of the threshold value of the applied voltage across the liquid crystal by expanding the twist angle of the nematic liquid crystal molecules to not less than 90°.

The problem with the STN mode is that the background of the display screen sustains a peculiar color due to interference between colors because of the use of the birefringence effect of liquid crystal. In order to solve this problem and to provide a proper black-and-white display in the STN mode, the application of an optical retardation compensator plate is considered to be effective. Display modes using the optical retardation compensator plate are mainly classified into two modes, that is, the double layered super-twisted nematic optical-retardation compensation mode (hereinafter, referred to as the DSTN mode) and the film-type optical-retardation compensation mode (hereinafter, referred to as the film-addition mode) wherein a film having optical anisotropy is provided.

The DSTN mode uses a two-layered construction that has a display-use liquid crystal cell and a liquid crystal cell which are orientated with a twist angle in a direction opposite to that of the display-use liquid crystal cell. The film-addition mode uses a construction wherein a film having optical anisotropy is disposed. Here, the film-addition mode is considered to be more prospective in the standpoint of light weight and low costs. Since the application of such an optical-retardation compensation mode makes it possible to improve black-and-white display characteristics, color STN liquid crystal display devices have been achieved that enable color display by installing color-filter layers in STN-mode display devices.

The TN modes are, on the other hand, classified into the Normally Black mode and the Normally White mode. In the Normally Black mode, a pair of polarizer plates are placed with their polarization directions in parallel with each other, and black display is provided in a state where no ON voltage is applied across the liquid crystal layer (OFF state). In the Normally White mode, a pair of polarizer plates are placed with their polarization directions orthogonal to each other, and white display is provided in the OFF state. Here, the Normally White mode is considered to be more prospective from the standpoints of display contrast, color reproducibility, viewing angle dependency, etc.

However, in the TN-mode liquid crystal display device, liquid crystal molecules have a refractive index anisotropy $\Delta n$, and are orientated so as to incline to the above and below substrates. For these reasons, the viewing angle dependency increases: i.e., the contrast of displayed images varies depending upon the direction and angle of the viewer.

FIG. 11 schematically shows the cross-sectional construction of a TN liquid crystal display element 31. This state shows liquid crystal molecules 32 slanting upward slightly as a result of application of a voltage for halftone display. In such a liquid crystal display element 31, a linearly polarized ray 35 passing through the surfaces of a pair of substrates 33 and 34 along the normals thereto, and linearly polarized rays 36 and 37 passing through those surfaces not along the normals thereto cross the liquid crystal molecules 32 at different angles. Besides, the liquid crystal molecules 32 have a refractive index anisotropy $\Delta n$. Therefore, the linearly polarized rays 35, 36 and 37, upon passing through the liquid crystal molecules 32 in different directions, produce ordinary and extraordinary rays. The linearly polarized rays 35, 36 and 37 are converted to elliptically polarized rays according to the phase difference between the ordinary and extraordinary rays, which cause the viewing angle dependency.

In addition, in an actual liquid crystal layer, the liquid crystal molecules 32 show different tilt angles in the vicinity of the midpoint between the substrates 33 and 34 and in the vicinities of the substrates 33 and 34. The liquid crystal molecules 32 are twisted by 90° around the normal.

For those reasons described so far, the linearly polarized rays 35, 36 and 37 passing through the liquid crystal layer are affected by the birefringence effect in various ways depending upon, for example, the directions and the angles thereof, resulting in complex viewing angle dependency.

Such viewing angle dependency can be observed, as examples, in the following situations. If the viewing angle increases from the normal to the display screen in the standard viewing direction, i.e. downward, and exceeds a certain angle, the displayed image has a distinct color (hereinafter, referred to as the coloration phenomenon), or is reversed in black and white (hereinafter, referred to as the tone reversion phenomenon). If the viewing angle increases from the normal in the opposite viewing direction, i.e. upward, the contrast decreases abruptly.

The aforementioned liquid crystal display device has another problem that the effectual range of viewing angle narrows with a larger display screen. When a large liquid crystal display device is viewed from a short distance in the front thereof, the same color may appear different in the uppermost and lowermost parts of the large screen due to the effect of the viewing angle dependency. This is caused by a wider range of viewing angle required to encompass the whole screen surface, which is equivalent to a viewing direction which is increasingly far off center.

To restrain the viewing angle dependency, Japanese Laid-Open Patent Application NO. 55-600/1980 (Tokukaisho 55-600) and No. 56-97318/1981 (Tokukaisho 56-97318) suggest that an optical retardation compensator plate (retardation compensator film) be inserted as an optical element having optical anisotropy between the liquid crystal display element and one of polarize plates.

According to the method, the elliptically polarized ray converted from a linearly polarized ray by passing through liquid crystal molecules having refractive index anisotropy is directed through the optical retardation compensator plates(s) disposed on the side(s) of the liquid crystal layer having refractive index anisotropy. Hence, the phase difference between the ordinary and extraordinary rays which occurs to the viewing angle are compensated for, and the elliptically polarized ray is converted back to the linearly polarized ray, which enables the restraint of the viewing angle dependency.

Japanese Laid-Open Paten Application No. 5-313159/1993 (Tokukaihei 5-313159), as an example, discloses an optical retardation compensator plates of the above kind represented by a refractive index ellipsoid with one of the principal refractive indices parallel to the normal to the surface of the optical retardation compensator plate. Nevertheless, this optical retardation compensator plate still cannot satisfactorily restrain the tone reversion phenomenon that occurs when the viewing angle increases in the standard viewing direction.

In order to eliminate the tone reversion phenomenon, Japanese Laid-Open Patent Application No. 57-186735/1982 (Tokukaisho 57-186835) discloses the so-called pixel dividing method, in which a displayed pattern (pixel) is divided and orientation is controlled so that each divided segment has its own viewing angle characteristics independent from those of the other segments. According to the method, since the liquid crystal molecules stand upwards in different directions from segment to segment, the viewing angle dependency can be eliminated. However, the problem of a lower contrast when the viewing angle increases upward or downward cannot be solved.

Japanese Laid-Open Patent Applications No. 6-118406/1994 (Tokukaihei 6-118406) and No. 6-194645/1994 (Tokukaihei 6-194645) disclose technologies to combine the pixel dividing method and an optical retardation compensator plate.

The liquid crystal display device disclosed in Japanese Laid-Open Patent Application No. 6-118406/1994 includes an optical anisotropic film (optical retardation compensator plate) interposed between the liquid crystal panel and the polarizer plate to, for example, improve the contrast. The retardation compensator plate (optical retardation compensator plate) disclosed in Japanese Laid-Open Patent Application No. 6-194645/1994 is set to have almost no phase difference in a plane parallel to the surface of the retardation compensator plate and to have a larger refractive index in a plane perpendicular to the surface of the retardation compensator plate than the refractive index in a plane parallel thereto, in order to have a negative refractive index. Therefore, when a voltage is applied, the positive refractive index occurring to the liquid crystal display element is compensated for and viewing angle dependency can be decreased.

Nevertheless, the application of the pixel dividing method to the use of this optical retardation compensator plate still fails to uniformly restrain the decrease in contrast in the vertical directions, coloration phenomenon still occurs in oblique directions when the viewing angle is 45°.

For these reasons, there are limits to the restraining of the contrast variations, coloration phenomenon, and tone reversion phenomenon related with viewing angle, by means of a retardation compensator plate represented by a refractive index ellipsoid positioned upright, i.e., a refractive index ellipsoid with one of the principal refractive indices thereof parallel to the normal to the surface of the retardation compensator plate.

Hence, Japanese Laid-Open Patent Application No. 6-75116/1994 (Tokukaihei 6-75116) suggest the use of an optical retardation compensator plate represented by a refractive index ellipsoid with the principal refractive indices inclining to the normal to the surface of the optical retardation compensator plate. This method adopts two kinds of optical retardation compensator plates as follows.

One of the optical retardation compensator plates can be represented by such a refractive index ellipsoid that the smallest of the three principal refractive indices is parallel to the surface, one of the two larger principal refractive indices inclines to the surface of the optical retardation compensator plate by an angle θ, the remaining principal refractive index inclines to the normal to the optical retardation compensator plate by the same angle θ, and the angle θ satisfies $20°≦θ≦70°$.

The other optical retardation compensator plate can be represented by a refractive index ellipsoid inclining to the surface, where the three principal refractive indices, na, nb, and nc, are mutually related by the inequality na=nc>nb, and the direction of the principal refractive index nb parallel to the normal to the surface and the direction of either the principal refractive index na or nc in the surface recline either clockwise or counterclockwise around the direction of the principal refractive index nc or na in the surface.

As for the former optical retardation compensator plate, a uniaxial and biaxial optical retardation compensator plate can be used. For the latter one, two optical retardation compensator plates, instead of one, can be used in such a combination that the two principal refractive indices nb form an angle of 90°.

A liquid crystal display device, incorporating at least one such optical retardation compensator plate between the liquid crystal display element and the polarizer plate exhibits some restraint in the contrast variations, coloration phenomenon, and tone reversion phenomenon caused by the viewing angle dependency of the display screen.

However, with today's increasingly large demand on a wider effectual range of viewing angle and superb display quality, a better restraint in the viewing angle dependency is crucial. In this context, the optical retardation compensator plate disclosed in Japanese Laid-Open Patent Application No. 6-75116/1994 (Tokukaihei 6-75116) above does not provide satisfactory solutions and needs to be improved.

SUMMARY OF THE INVENTION

In view of the above problems, the first object of the present invention is, on top of the improvement by the compensation effects by the optical retardation compensator plate, to restrain the viewing angle dependency, and especially, to effectively restrain the tone reversion in the opposite viewing direction when halftone is being displayed by applying a voltage that is close to the threshold voltage for the liquid crystal.

The second object of the present invention is, on top of the improvement by the compensation effects by the optical retardation compensator plate, to restrain the viewing angle dependency, and especially, to effectively restrain the coloration phenomenon.

In order to accomplish the first object, a liquid crystal display device of the first arrangement in accordance with the present invention includes:

a liquid crystal display element formed by sealing a liquid crystal layer between a pair of substrates;

a pair of polarizers disposed so as to flank the liquid crystal display element; and at least one optical retardation compensator plate disposed between the liquid crystal display element and the polarizers, the optical retardation compensator plate being represented by an inclining refractive index ellipsoid, wherein the pretilt angle formed by the orientation films and the longer axes of liquid crystal molecules in the liquid crystal layer is set within such a range that tone reversion does not occur in the opposite viewing direction when halftone is being displayed by applying to the liquid crystal a voltage that is close to the threshold voltage for the liquid crystal.

As explained above, the first arrangement of the present invention incorporates, between the liquid crystal layer and the polarizer, an optical retardation compensator plate represented by an inclining refractive index ellipsoid. Therefore, with the arrangement, for a case where a linearly polarized ray is converted to an elliptically polarized ray according to the phase difference between the ordinary and extraordinary rays developed from the linearly polarized ray upon the passing through the liquid crystal layer possessing birefringence, the optical retardation compensator plate compensates for the phase difference between the ordinary and extraordinary rays that varies depending upon the viewing angle.

With the liquid crystal display device of the first arrangement in accordance with the present invention, the pretilt angle of the liquid crystal layer sealed in the liquid crystal display element is set within such a range that a tone reversion does not occur in the opposite viewing direction when halftone is being displayed by applying to the liquid crystal a voltage that is close to the threshold voltage for the liquid crystal. This can eliminate the tone reversion in the opposite viewing direction on a screen displaying halftone, and thereby further restrain the viewing angle dependency of the screen. The contrast variations and coloration are also restrained better than only by the compensation function by the optical retardation compensator plate.

In the first arrangement above, the abrupt decrease in luminance can be restrained in the standard viewing direction when halftone is being displayed, by further setting the pretilt angle within such a range that luminance does not decrease abruptly in the standard viewing direction when halftone is being displayed by applying to the liquid crystal a voltage that is close to the threshold voltage for the liquid crystal.

For these reasons, with the arrangement, the contrast ratio in black and white display is not affected by the viewing angle of the observer, and the quality of images displayed by the liquid crystal display device is greatly improved.

In order to accomplish the first object, a liquid crystal display device of the second arrangement in accordance with the present invention includes:

a liquid crystal display element formed by sealing a liquid crystal layer between a pair of substrates;

a pair of polarizers disposed so as to flank the liquid crystal display element; and at least one optical retardation compensator plate disposed between the liquid crystal display element and the polarizers, the optical retardation compensator plate being represented by an inclining refractive index ellipsoid, wherein the value of applied voltage for displaying halftone obtained by applying to the liquid crystal a voltage that is close to the threshold voltage for the liquid crystal is set within such a range that tone reversion does not occur in the opposite viewing direction when halftone is being displayed.

Even if a linearly polarized ray is converted to an elliptically polarized ray according to the phase difference between the ordinary and extraordinary rays developed from the linearly polarized ray upon the passing through the liquid crystal layer possessing birefringence, the second arrangement compensates for the phase difference by the optical retardation compensator plate similarly to the first arrangement.

With the liquid crystal display device of the second arrangement, the value of applied voltage for displaying halftone obtained by applying to the liquid crystal a voltage that is close to the threshold voltage for the liquid crystal is set within such a range that tone reversion does not occur in the opposite viewing direction when halftone is being displayed. This can eliminate the tone reversion in the opposite viewing direction with a screen displaying halftone, and thereby further restrain the viewing angle dependency of the screen. The contrast variations and coloration are also restrained better than only by the compensation function by the optical retardation compensator plate.

In the second arrangement above, the abrupt decrease in luminance can be restrained in the standard viewing direction when halftone is being displayed, by further setting the value of applied voltage for displaying halftone obtained by applying to the liquid crystal a voltage that is close to the threshold voltage for the liquid crystal within such a range that luminance does not decrease abruptly in the standard viewing direction when halftone is being displayed.

For these reasons, with the arrangement, the contrast ratio in black and white display is not affected by the viewing angle of the observer, and the quality of images displayed by the liquid crystal display device is greatly improved.

In order to accomplish the second object, a liquid crystal display device of the third arrangement in accordance with the present invention includes:

a crystal display element formed by sealing a liquid crystal layer between a pair of substrates;

a pair of polarizers disposed so as to flank the liquid crystal display element; and at least one optical retardation compensator plate disposed between the liquid crystal display element and the polarizers, the optical retardation compensator plate being represented by an inclining refractive index ellipsoid, wherein the ratios of the variation in the refractive index anisotropy, $\Delta n_L$, of the liquid crystal material for the liquid crystal layer with the wavelength of light and of the variation in the refractive index anisotropy, $\Delta n_F$, of the optical retardation compensator plate with the wavelength of light are set within such a range that viewing angle dependency does not cause coloration on the liquid crystal screen.

Even is a linearly polarized ray is converted to an elliptically polarized ray according to the phase difference between the ordinary and extraordinary rays developed from the linearly polarized ray upon the passing through the liquid crystal layer possessing birefringence, the arrangement compensates for the phase difference by the optical retardation compensator plate, similarly to the first arrangement.

With the liquid crystal display device of the third embodiment, the ratios of the variation in the refractive index anisotropy, $\Delta n_L$, of the liquid crystal material for the liquid crystal layer with the wavelength of light and of the variation in the refractive index anisotropy, $\Delta n_F$, of the optical retardation compensator plate with the wavelength of light are set within such a range that viewing angle dependency does not cause coloration on the liquid crystal screen. This can further restrain coloration on the screen. The contrast variations and coloration are also restrained better than only by the compensation function by the optical retardation compensator plate.

Moreover, as described above, in the first, second, and third arrangements, the liquid crystal display device is preferably arranged so that the refractive index anisotropy, $\Delta n_L(550)$, of the liquid crystal material for the liquid crystal layer to light having a wavelength of 550 nm is set within a range larger than 0.060 and smaller than 0.120.

The setting can eliminate the phase difference that occurs to the liquid crystal display element in accordance with the viewing angle. That can further restrain the contrast variations and tone reversion phenomenon in the right- and left-hand directions, as well as the coloration phenomenon that occurs depending upon the viewing angle.

In such an event the phase difference that occurs to the liquid crystal display element in accordance with the viewing angle can be more effectively eliminated by setting the refractive index anisotropy, $\Delta n_L(550)$, of the liquid crystal material for the liquid crystal layer to light having a wavelength of 550 nm so as to be within a range not smaller than 0.070 and not larger than 0.095.

This can surely restrain the contrast variations and tone reversion phenomenon in the right- and left-hand directions of the images displayed by the liquid crystal display device.

Moreover, in the first, second, and third arrangements, the liquid crystal display device is preferably arranged so that the or each optical retardation compensator plate is represented by a refractive index ellipsoid inclining by an inclination angle $\theta$ set within a range of 15° to 75°.

By setting the inclination angle of the refractive index ellipsoid to be within a range of 15° to 75° with respect to the or each optical retardation compensator plate incorporated in the liquid crystal display device, it is assured that the present invention provides the aforementioned compensation function for the phase difference by the optical retardation compensator plate.

Moreover, in the first, second, and third arrangements, the liquid crystal display device is preferably arranged so that the or each optical retardation compensator plate has a product $(n_a-n_c) \times d$, of the difference between the principal refractive indices, na and nb, and the thickness, d, of the optical retardation compensator plate, the product being set to be from 80 nm to 250 nm.

By setting the product, $(n_a-n_b) \times d$, of the difference between the principal refractive indices, na and nb, and the thickness, d, of the optical retardation compensator plate, so as to be from 80 nm to 250 nm with respect to the or each optical retardation compensator plate incorporated in the liquid crystal display device, it is assured that the present invention provides the aforementioned compensation function for the phase difference by the optical retardation compensator plate.

The present invention will become more fully understood from the detailed description given hereinbelow and the accompanying drawings which are given by way of illustration only, are not in any way intended to limit the scope of the claims of the present invention.

DESCRIPTION OF THE EMBODIMENTS

[First Embodiment]

The following description will discuss the first embodiment in accordance with the present invention.

Figure 1:
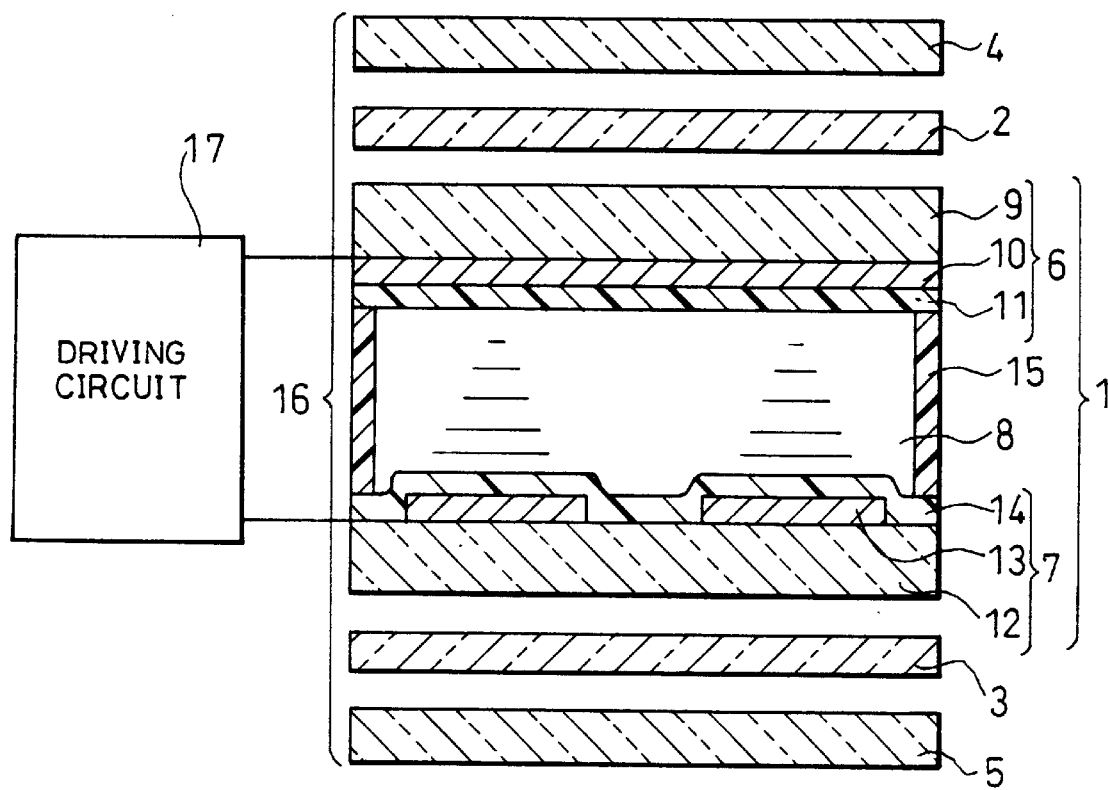
FIG. 1 is a cross-sectional view showing the arrangement of a liquid crystal display device in accordance with the first embodiment in a decomposed manner.

As illustrated in FIG. 1, the liquid crystal display device of the present embodiment is provided with a liquid crystal display element 1, a pair of optical retardation compensator plates 2 and 3, and a pair of polarizer plates (polarizers) 4 and 5.

The liquid crystal display element 1 is constituted by electrode substrates 6 and 7 that are placed face to face with each other and a liquid crystal layer 8 that is sandwiched therebetween. The electrode substrate 6 is constructed as follows: a glass substrate (a transparent substrate) 9 is provided as a base, a transparent electrode 10, made of ITO (Indium Tin Oxide), is formed on the surface, of the glass substrate 9, facing the liquid crystal layer 8, and an orientation film 11 is formed on the transparent electrode 10. The electrode substrate 7 is constructed; a glass substrate (a transparent substrate) 12 is provided as a base, a transparent electrode 13, made of ITO, is formed on the surface, of the glass substrate 12, facing the liquid crystal layer 8, and an orientation film 14 is formed on the transparent electrode.

Although FIG. 1 shows a construction corresponding to two pixels for convenience of explanation, the transparent electrodes 10 and 13, which are strips with a predetermined width, are respectively placed on the glass substrates 9 and 12 with predetermined intervals all over the liquid crystal display element 1, and are designed so that they are orthogonal to each other on the glass substrates 9 and 12, when viewed in a direction perpendicular to the substrate surfaces. Portions at which the transparent electrodes 10 and 13 intersect each other correspond to pixels for carrying out display, and the pixels are placed in a matrix format over the entire structure of the present liquid crystal display device.

The electrode substrates 6 and 7 are bonded by seal resin 15, and a liquid crystal layer 8 is sealed inside the space formed by the seal resin 15 and the electrode substrates 6 and 7. A voltage is applied via the transparent electrodes 10 and 13 by a driving circuit (voltage application means) 17 according to display data.

The pretilt angle of the liquid crystal layer 8 of the present liquid crystal display device is set so as to produce the best properties when combined with the compensation function for phase difference by the optical retardation compensator plates 2 and 3 (will be described later in detail).

In the present liquid crystal display device, a unit, formed by incorporating optical retardation compensator plates 2 and 3 and polarizer plates 4 and 5 into the above-mentioned liquid crystal display element 1, is referred to as a liquid crystal cell 16.

Figure 2:
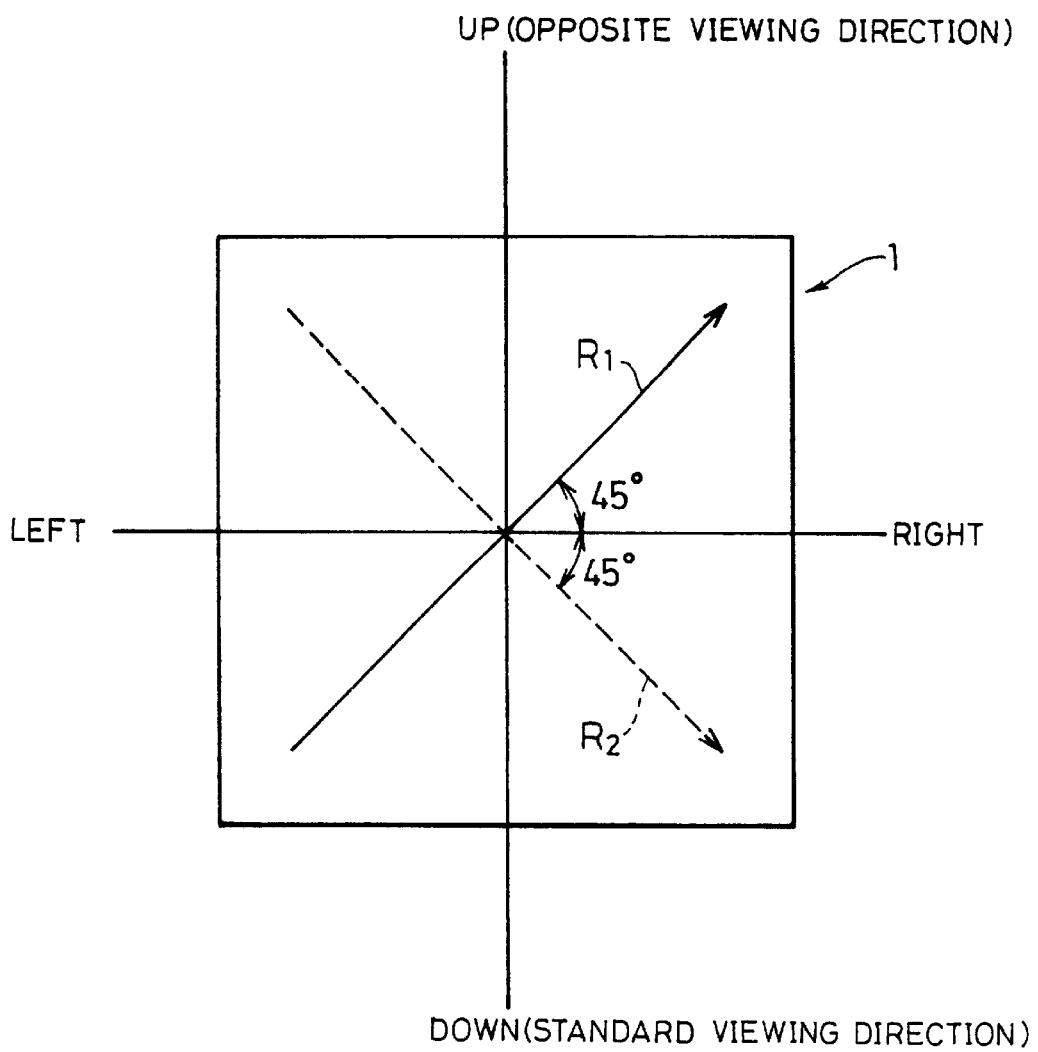
FIG. 2 is an explanatory drawing showing the relation between the rubbing direction of the orientation film and the standard viewing direction in the liquid crystal display device.

The orientation films 11 and 14 are treated with a rubbing technique in advance so that the liquid crystal molecules between the are orientated with a twist angle of about 90°. As shown in FIG. 2, the rubbing direction $R_1$ of the orientation film 11 and the rubbing direction $R_2$ of the orientation film 14 are set to be orthogonal to each other.

The optical retardation compensator plates 2 and 3 are provided between the liquid crystal display element 1 and the respective polarizer plates 4 and 5 disposed to flank the liquid crystal display element 1. The optical retardation compensator plates 2 and 3 are constituted by a support base made of a transparent organic polymer and discotic liquid crystal. The discotic liquid crystal is treated with an oblique orientation technique or hybrid orientation, and crosslinked. As a result, the optical retardation compensator plates 2 and 3 are formed so as to have a refractive index ellipsoid (will be described later in detail) that inclines to the optical retardation compensator plates 2 and 3.

As for the support base of the optical retardation compensator plates 2 and 3, triacetylcellulose (TAC), which is generally used for polarizer plates, is suitably applied with high reliability. Besides this, colorless, transparent organic polymeric films made of polycarbonate (PC), polyethyleneterephthalate (PET), etc., which are superior in environment resistance and chemical resistance, are also suitably applied.

Figure 3:
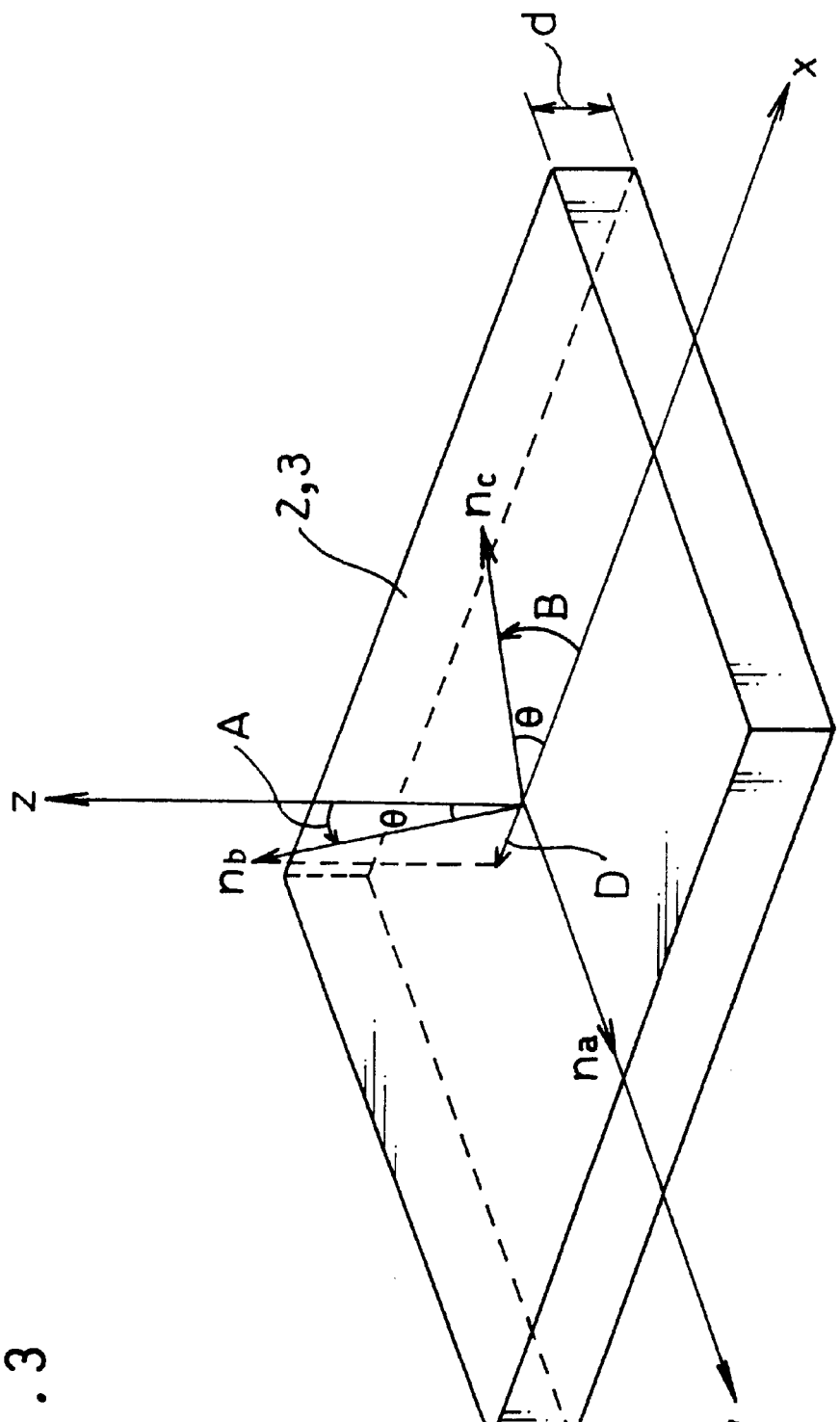
FIG. 3 is a perspective view illustrating the principle refractive indices of an optical retardation compensator plate of the liquid crystal display device.

As illustrated in FIG. 3, each of the optical retardation compensator plates 2 and 3 has principal refractive indices na, nb and nc pointing in three different directions. The direction of the principal refractive index na coincides with the direction of the y-coordinate axis among the mutually orthogonal x-, y-, and z-coordinate axes. The direction of the principal refractive index nb inclines by θ in the direction of arrow A with respect to the z-coordinate axis (parallel to a normal to the surface) that is perpendicular to the surface of the optical retardation compensator plates 2 and 3, which surface corresponds to the screen.

The principal refractive indices na, nb, and nc of the optical retardation compensator plates 2 and 3 are related to each other by the inequality: na=nc>nb. Therefore, there exists only one optic axis, and the optical retardation compensator plates 2 and 3 have uniaxiality and a negative refractive index anisotropy. The first retardation value, (nc−na)×d, of the optical retardation compensator plates 2 and 3 equals almost 0 nm, since na=nc, while the second retardation value, (nc−nb)×d, is set to an arbitral value in a range from 80 nm to 250 nm. By setting the second retardation value in such a range, the compensation function for phase difference by the optical retardation compensator plates 2 and 3 is surely achieved. Note that (nc−na) and (nc−nb) each represent a refractive index anisotropy $\Delta n_F$, and that d represents the thickness of the optical retardation compensator plates 2 and 3.

The angle θ by which the direction of the principal refractive indices nb of the optical retardation compensator plates 2 and 3 incline, i.e. the inclination angle θ of the refractive index ellipsoids, is set to an arbitrary value in the range 15°≦θ≦75°. By setting the inclination angle θ to such a value, regardless of whether the refractive index ellipsoids incline clockwise or counterclockwise, the compensation function for phase difference by the optical retardation compensator plates 2 and 3 is surely achieved.

Instead of using the two optical retardation compensator plates 2 and 3, only one of them may be used and disposed on one side. Alternatively, both the optical retardation compensator plates 2 and 3 can be disposed on one side, one of them overlapping the other. As a further alternative, three or more optical retardation compensator plates may be used.

Figure 4:
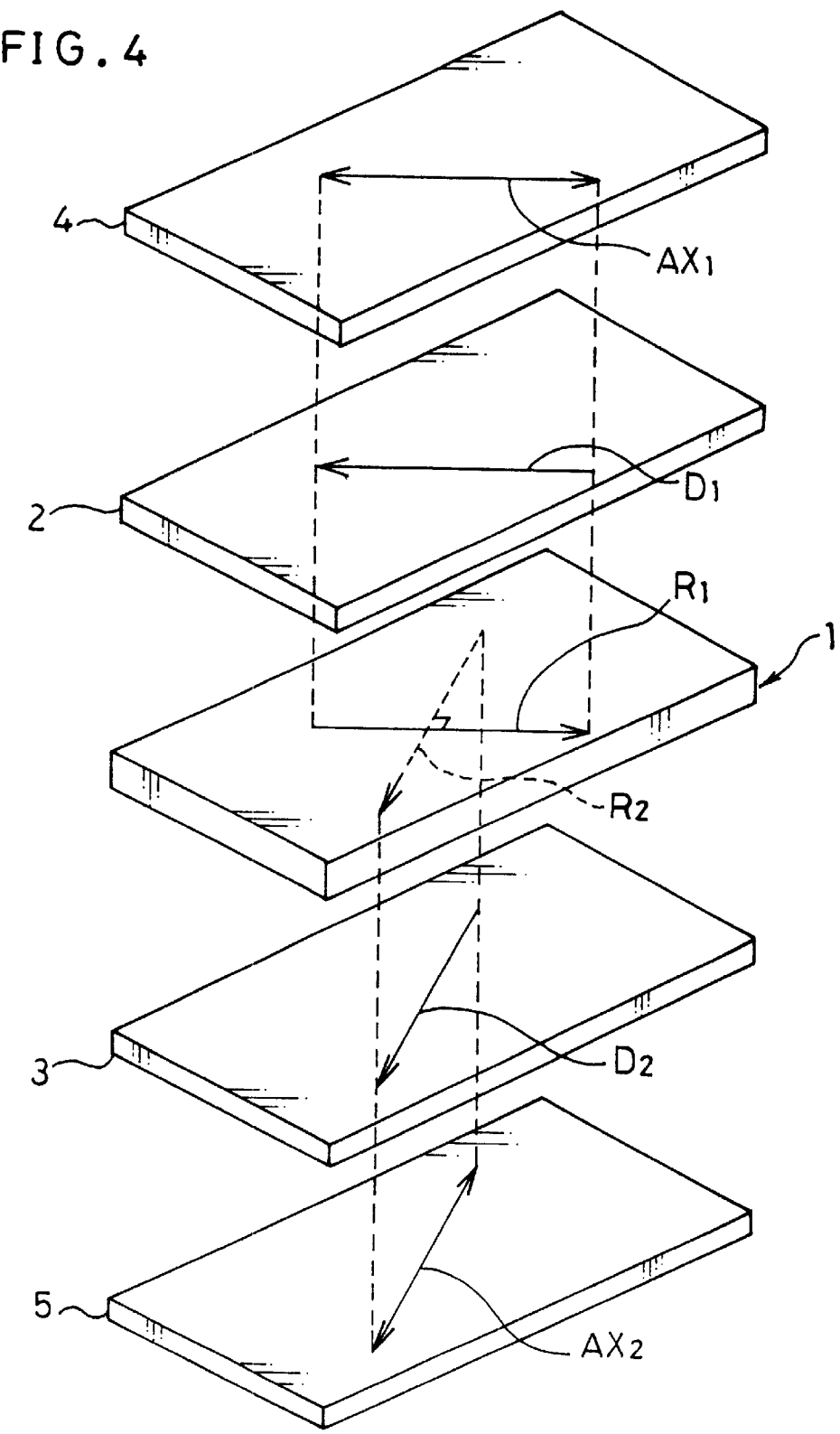
FIG. 4 is a perspective view showing the optical arrangement of a polarizer plate and the optical retardation compensator plate of the liquid crystal display device in a decomposed manner.

As illustrated in FIG. 4, in the present liquid crystal display device, the polarizer plates 4 and 5 in the liquid crystal display element 1 are arranged so that their absorption axes $AX_1$ and $AX_2$ are parallel to the rubbing directions $R_1$ and $R_2$ of the orientation films 11 and 14 respectively (see FIG. 1). In the present liquid crystal display device, since the rubbing directions $R_1$ and $R_2$ are orthogonal to each other, the absorption axes $AX_1$ and $AX_2$ are also orthogonal to each other.

Here, as illustrated in FIG. 3, the direction D is defined as a direction formed by projecting the direction of the principal refractive index nb, which inclines in such a direction to impart anisotropy to the optical retardation compensator plates 2 and 3, onto the surface of the optical retardation compensator plates 2 and 3. As illustrated in FIG. 4, the optical retardation compensator plate 2 is placed so that the direction D (direction $D_1$) is parallel to the rubbing direction $R_1$, and the optical retardation compensator plate 3 is placed so that the direction D (direction $D_2$) is parallel to the rubbing direction $R_2$.

With the above-mentioned arrangement of the optical retardation compensator plates 2 and 3 and the polarizer plates 4 and 5, the present liquid crystal display device can carry out so-called Normally White display wherein rays of light are allowed to pass during OFF time so that white display is provided.

In general, in optical anisotropic materials such as liquid crystal and optical retardation compensator plates (phase difference films), the above-mentioned anisotropy of the three-dimensional principal refractive indices na, nc and nb is represented by a refractive index ellipsoid. The refractive-index anisotropy Δn assumes different values depending on which direction the refractive index ellipsoid is observed.

Next, the aforementioned setting of the pretilt angle for the liquid crystal layer 8 will be explained in detail.

Figure 5:
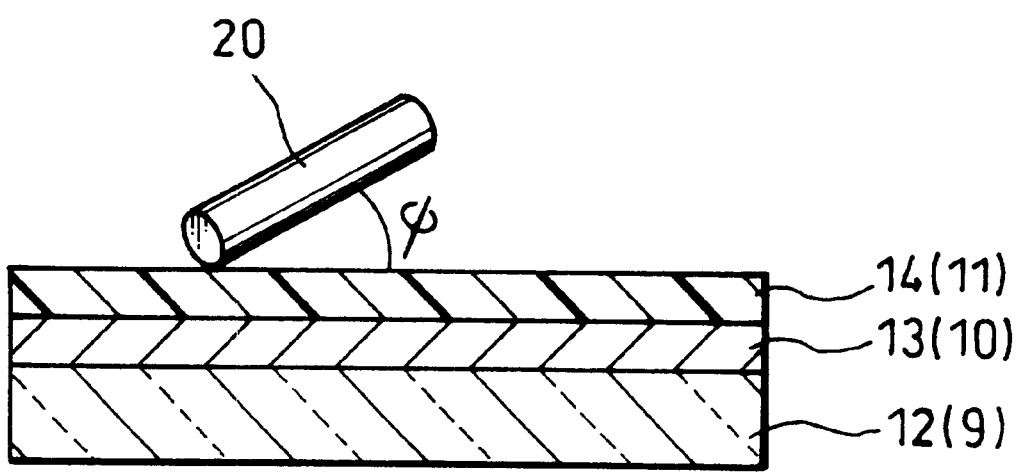
FIG. 5 is an explanatory drawing showing the pretilt angle formed by the linger axes of the liquid crystal molecules and the orientation film.

As illustrated in FIG. 5, the pretilt angle is the angle φ formed by the orientation film 14 (11) and the longer axes of liquid crystal molecules 20, and determined by the combination of rubbing treatment of the liquid crystal material and the rubbing of the orientation films 11 and 14.

As mentioned earlier, the pretilt angle of the liquid crystal layer 8 of the present liquid crystal display device is set to produce the best properties when combined with the compensation function for phase difference by the optical retardation compensator plates 2 and 3. Specifically, the pretilt angle is set in a range that does not cause tone reversion in the opposite viewing direction in a halftone display state where a voltage that is close to the threshold voltage for the liquid crystal is applied to the liquid crystal. Here, since the Normally White display mode is selected, the halftone display state is close to white color. Hereinafter, the halftone display state close to white color will be referred to as white tone.

It has been confirmed through experiments that the larger the pretilt angles are, the less likely the tone reversion occurs in the opposite viewing direction, whereas too large pretilt angles cause an abrupt decrease in luminance in the standard viewing direction when white tone is being displayed. Thus, the pretilt angle also needs to be set within such a range that luminance does not decrease abruptly in the standard viewing direction when white tone is being displayed.

More specifically, used as the orientation films 11 and 14 and the liquid crystal material is a combination of orientation films and a liquid crystal material that results in a pretilt angle more than 2° and less than 12°. More preferable is a combination that results in a pretilt angle not less than 4° and not more than 10°.

The setting of the pretilt angle in a range more than 2° and less than 12° enables the liquid crystal display device to be free from problem-posing tone reversion in the opposite viewing direction when white tone is being displayed and to be viewed in every direction at the viewing angle of 50° which is typically required for liquid crystal display devices.

Especially, the setting of the pretilt angle in a range not less than 4° and not more than 10° enables the liquid crystal display device to be viewed without tone reversion at all in the opposite viewing direction at the viewing angle of 70° when white tone is being displayed.

Selected as the liquid crystal material for the liquid crystal layer 8 of the liquid crystal display device in accordance with the present invention is a liquid crystal material of which the refractive index anisotropy, $\Delta n_L(550)$, to light having a wavelength of 550 nm is designed to be within a range larger than 0.060 and smaller than 0.120. More preferably, a liquid crystal material of which the refractive index anisotropy, $\Delta n_L(550)$, is designed to be within a range not smaller than 0.070 and not larger than 0.095 is used.

As a result, the optical retardation compensator plates 2 and 3 become capable of compensating for the phase difference. And so does the setting of the pretilt angle in the range above. Moreover, the decrease in contrast ratio in the opposite viewing direction can be further restrained, and the tone reversion phenomenon in the right- and left-hand directions can be further restrained.

As explained so far, the liquid crystal display device of the present embodiment includes, between the liquid crystal display element 1 and the polarizer plates 4 and 5, the optical retardation compensator plates 2 and 3 each represented by a refractive index ellipsoid having three principal refractive indices, na, nb, and nc, mutually related by the inequality na=nc>nb, the refractive index ellipsoid inclining as the direction of the principal refractive index nb parallel to the normal to the surface and the direction of either the principal refractive index na or nc in the surface recline either clockwise or counterclockwise around the direction of the principal refractive index nc or na in the surface.

wherein the pretilt angle of the liquid crystal layer 8 is set within such a range that tone reversion does not occur in the opposite viewing direction when halftone is being displayed by applying to the liquid crystal a voltage that is close to the threshold voltage for the liquid crystal.

As a result, the tone reversion phenomenon that occurs in the opposite direction according to the viewing angle when white tone (because Normally White display is being adopted) is being displayed can be, above all, effectively restrained by the compensation function for phase difference that occurs to the liquid crystal display element 1 according to the viewing angle by the setting of the pretilt angle in the range above, as well as by the compensation function by the optical retardation compensator plates 2 and 3. Besides, the contrast variations can be improved, resulting in display of high quality images.

Besides, the liquid crystal display device of the present embodiment employs as the liquid crystal material for the liquid crystal layer 8 a liquid crystal material of which the refractive index anisotrophy, $\Delta n_L$ (550), to light having a wavelength of 550 nm, is designed to be within a range larger than 0.060 and smaller than 0.120. Therefore, the optical retardation compensator plates 2 and 3 become capable of compensating for the phase difference. And so does the setting of the pretilt angle in the range above. Moreover, the decrease in contrast ratio in the opposite viewing direction can be further restrained, and the tone reversion phenomenon in the right—and left-hand directions can be further restrained.

Note that although the liquid crystal display device of Normally White display has been taken as an example in the description above, the same effects can be obtained with a liquid crystal display device of Normally Black display by achieving compensation function for phase difference by the setting of the pretilt angle within such a range that tone reversion does not occur in the opposite viewing direction when halftone (black tone) is being displayed by applying to the liquid crystal a voltage that is close to the threshold voltage for the liquid crystal, as well as by the compensation function by the optical retardation compensator plates 2 and 3.

Note also that although the liquid crystal display device of the simple matrix method has been taken as an example in the description of the embodiment above, the present invention can be applied to a liquid crystal display device of an active matrix method using active switching elements such as TFTs.

SECOND EMBODIMENT

The following description will discuss another embodiment in accordance with the present invention. Here, for convenience, members of the present embodiment that have the same function as members of the first embodiment, and that are mentioned in the first embodiment are indicated by the same reference numerals and description thereof is omitted.

The liquid crystal display device of the present embodiment is configured almost in the same manner as is the liquid crystal display device of the first embodiment shown in FIG. 1, except the following points:

The liquid crystal display device of the first embodiment includes the liquid crystal layer 8 of which the pretilt angle is set in range that does not cause tone reversion in the opposite viewing direction in a halftone display state where a voltage that is close to the threshold voltage for the liquid crystal is applied to the liquid crystal layer 8, so as to produce the best properties when combined with the compensation function for phase difference by the optical retardation compensator plates 2 and 3.

The liquid crystal display device of the present embodiment, by contrast, includes a liquid crystal layer 8 such that the value of the applied voltage for displaying halftone obtained by applying to the liquid crystal layer 8 a voltage that is close to the threshold voltage for the liquid crystal is set within such a range that tone reversion does not occur in the opposite viewing direction when halftone is being displayed, so as to produce the best properties when combined with the compensation function for phase difference by the optical retardation compensator plates 2 and 3.

Next, the above differences will be explained in detail.

Since the liquid crystal display device of the present embodiment is of Normally White display, the value of the applied voltage for realizing halftones display state where a voltage that is close to the threshold voltage for the liquid crystal is applied to the liquid crystal, i.e. white tone, is set within such a range that tone reversion does not occur in the opposite viewing direction when that voltage is being applied.

It has been confirmed through experiments that the lower the transmittance when white tone is being displayed is, the less likely the tone reversion occurs in the opposite viewing direction when white tone is being displayed. On the other hand, too low transmittances cause an abrupt decrease in luminance in the standard viewing direction and in the right—and left-hand directions. Thus, the voltage applied to the liquid crystal that determines the transmittance when white tone is being displayed needs to be set also within such a range that luminance does not decrease abruptly in the standard viewing direction and in the right—and left-hand directions when white tone is being displayed.

Specifically, the voltage applied to the liquid crystal when white tone is being displayed is set so that the transmittance when white tone is being displayed is higher than 85% that in the OFF state. In such a case, the voltage applied to the liquid crystal when white tone is being displayed is more preferably set so that the transmittance when white tone is being displayed is in a range not less than 90% and not more than 97% that in the OFF state. The OFF state refers to a state where the voltage applied to the liquid crystal is zero.

The setting of the voltage applied to the liquid crystal when white tone is being displayed so that the transmittance when white tone is being displayed is higher than 85% that in the OFF state enables the liquid crystal display device to be free from problem-posing tone reversion in the opposite viewing direction when white tone is being displayed and to be viewed in every direction at the viewing angle of 50° which is typically required for liquid crystal display devices.

Especially, the setting of the voltage applied to the liquid crystal when white tone is being displayed so that the transmittance when white tone is being displayed is in a range not less than 90% and not more than 97% that in the OFF state enables the liquid crystal display device to be viewed without tone reversion at all in the opposite viewing direction at the viewing angle of 70° when white tone is being displayed.

As explained above, the liquid crystal display device of the present embodiment includes, between the liquid crystal display element 1 and the polarizer plates 4 and 5, the optical retardation compensator plates 2 and 3 each represented by a refractive index ellipsoid having three principal refractive indices, na, nb, and nc, mutually related by the inequality na=nc>nb, the refractive index ellipsoid inclining as the direction of the principal refractive index nb parallel to the normal to the surface and the direction of either the principal refractive index na or nc in the surface recline either clockwise or counterclockwise around the direction of the principal refractive index nc or na in the surface, wherein the value of the applied voltage for realizing halftone display where a voltage that is close to the threshold voltage for the liquid crystal is applied to the liquid crystal is set within such a range that tone reversion does not occur in the opposite viewing direction in the state where that voltage is applied.

As a result, the tone reversion phenomenon that occurs in the opposite direction according to the viewing angle when white tone (because Normally White display is being adopted) is being displayed can be, above all, effectively restrained by the compensation function for phase difference that occurs to the liquid crystal display element 1 according to the viewing angle by the setting of the voltage applied to the liquid crystal when white tone is being displayed in the range above, as well as by the compensation function by the optical retardation compensator plates 2 and 3. Besides, the contrast variations can be improved, resulting in display of high quality images.

Besides, similarly to the liquid crystal display device of the previous embodiment, by employing as the liquid crystal material for the liquid crystal layer 8 a liquid crystal material of which the refractive index anisotropy, $\Delta n_L(550)$, to light having a wavelength of 550 nm is designed to be within a range larger than 0.060 and smaller than 0.120, and more preferably, within a range not smaller than 0.070 and not larger than 0.095, the decrease in contrast ratio in the opposite viewing direction and the tone reversion phenomenon in the right—and left-hand directions can be further restrained by the compensation function for phase difference by the setting of the voltage applied to the liquid crystal when white tone is being displayed in the range above, as well as by the compensation function by the optical retardation compensator plates 2 and 3.

Note that although the liquid crystal display device of Normally White display has been taken as an example in the description above, the same effects can be obtained with a liquid crystal display device of Normally Black display by achieving compensation function for phase difference by the setting of the voltage to be applied to the liquid crystal for halftone (black tone) display obtained by applying to the liquid crystal a voltage that is close to the threshold voltage for the liquid crystal within such a range that tone reversion does not occur in the opposite viewing direction when halftone is being displayed, as well as by the compensation function by the optical retardation compensator plates 2 and 3.

Note also that similarly to the first embodiment, apart from the liquid crystal display device of a simple matrix method, the present invention can be applied to a liquid crystal display device of an active matrix method using active switching elements such as TFTs.

THIRD EMBODIMENT

The following description will discuss another embodiment in accordance with the present invention. Here, for convenience, members of the present embodiment that have the same function as members of the previous embodiments, and that are mentioned in the previous embodiments are indicated by the same reference numerals and description thereof is omitted.

The liquid crystal display device of the present embodiment is configured almost in the same manner as is the liquid crystal display device of the first embodiment shown in FIG. 1, except the following points:

The liquid crystal display device of the first embodiment includes the liquid crystal layer 8 of which the pretilt angle is set in a range that does not cause tone reversion in the opposite viewing direction in a halftone display state where a voltage that is close to the threshold voltage for the liquid crystal is applied to the liquid crystal layer 8, so as to produce the best properties when combined with the compensation function for phase difference by the optical retardation compensator plates 2 and 3.

The liquid crystal display device of the present embodiment, by contrast, includes a liquid crystal layer 8 such that the ratios of the variation in the refractive index anisotropy, $\Delta n_L$, of the liquid crystal material for the liquid crystal layer 8 with the wavelength of light and of the variation in the refractive index anisotropy, $\Delta n_F$, of the optical retardation compensator plate with the wavelength of light are set within such a range that viewing angle dependence does not cause coloration on the liquid crystal screen, so as to produce the best properties when combined with the compensation function for phase difference by the optical retardation compensator plates 2 and 3.

Next, the above differences will be explained in detail.

Setting the ratios of the variation in the refractive index anisotropy, $\Delta n_L$, of the liquid crystal material for the liquid crystal layer 8 with the wavelength of light and of the variation in the refractive index anisotropy, $\Delta n_F$, of the optical retardation compensator plate with the wavelength of light within such a range that viewing angle dependency does not cause coloration on the liquid crystal screen refers to, in more specific terms, a combined use of optical retardation compensator plates 2 and 3 with a liquid crystal material that satisfy at least one of the range-setting conditions ① and ② below:

① The ratio, $\Delta n_L(450)/\Delta n_L(550)$, of the refractive index anisotropy, $\Delta n_L(450)$, of the liquid crystal material for the liquid crystal layer 8 to light having a wavelength of 450 nm and the refractive index anisotropy, $\Delta n_L(550)$, thereof to light having a wavelength of 550 nm, and the ratio, $\Delta n_F(450)/\Delta n_F(550)$, of the refractive index anisotropy, $\Delta n_F(450)$, of the optical retardation compensator plates 2 and 3 to light having a wavelength of 450 nm and the refractive index anisotropy, $\Delta n_F(550)$, thereof to light having a wavelength of 550 nm are set to satisfy the inequality:

$$0 \le \frac{(\Delta n_L(450)/\Delta n_L(550)) - 1}{(\Delta n_F(450)/\Delta n_F(550)) - 1} < 0.35$$

and are, more preferably, set to satisfy the inequality:

$$0 \le \frac{(\Delta n_L(450)/\Delta n_L(550)) - 1}{(\Delta n_F(450)/\Delta n_F(550)) - 1} \le 0.25$$

② The ratio, $\Delta n_L(650)/\Delta n_L(550)$, of the refractive index anisotropy, $\Delta n_L(650)$, of the liquid crystal material for the liquid crystal layer 8 to light having a wavelength of 650 nm and the refractive index anisotropy, $\Delta n_L(550)$, thereof to light having a wavelength of 550 nm, and the ratio, $\Delta n_F(650)/\Delta n_F(550)$, of the refractive index anisotropy, $\Delta n_F(650)$, of the optical retardation compensator plates 2 and 3 to light having a wavelength of 650 nm and the refractive index anisotropy, $\Delta n_F(550)$, thereof to light having a wavelength of 550 nm are set to satisfy the inequality:

$$0 \le \frac{1 - (\Delta n_L(650)/\Delta n_L(550))}{1 - (\Delta n_F(650)/\Delta n_F(550))} < 0.27$$

and are, more preferably, set to satisfy the inequality:

$$0 \le \frac{1 - (\Delta n_L(650)/\Delta n_L(550))}{1 - (\Delta n_F(650)/\Delta n_F(550))} \le 0.20$$

The use of a liquid crystal material and optical retardation compensator plates designed to satisfy at least one of the conditions ① and ② permits the effective restraints in, above all, the coloration phenomenon on the display screen, in addition to the restraint in the contrast variations, tone reversion phenomenon, and coloration phenomenon caused by the viewing angle dependency of the display screen by the compensation function for phase difference by the optical retardation compensator plates 2 and 3.

To be more specific, although in some instances still incapable of completely eliminating coloration at the viewing angle of 50°, which is the viewing angel typically required for liquid crystal display devices, satisfying at least one of the wider conditions of ① and ② enables the liquid crystal display device to be viewed in every direction without problems for real use.

And, satisfying at least one of the preferred conditions of ① and ② enables the liquid crystal display device to be viewed in every direction without any coloration at all at the viewing angle of 70°.

Furthermore, satisfying at least one of ① and ② restrains also contrast variations and tone reversion phenomenon better than does the compensation function by the optical retardation compensator plates 2 and 3 alone.

Figure 10:
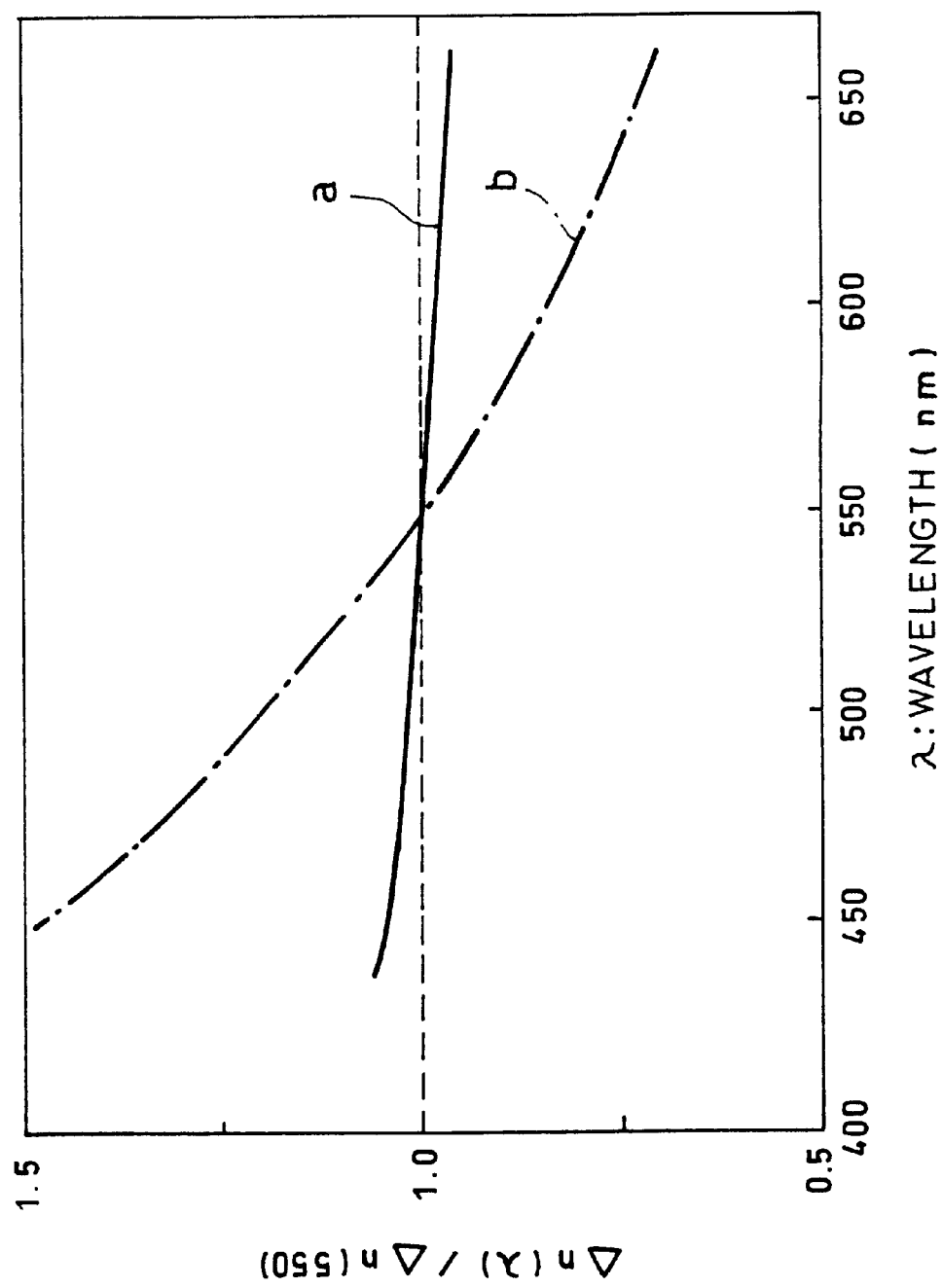
FIG. 10 is a graph showing $\Delta n(\lambda)/\Delta n_L(550)$, for wavelengths $\lambda$ of light, of an optical retardation compensator plate and a liquid crystal material used as the liquid crystal layer of the liquid crystal display device.
Figure 11:
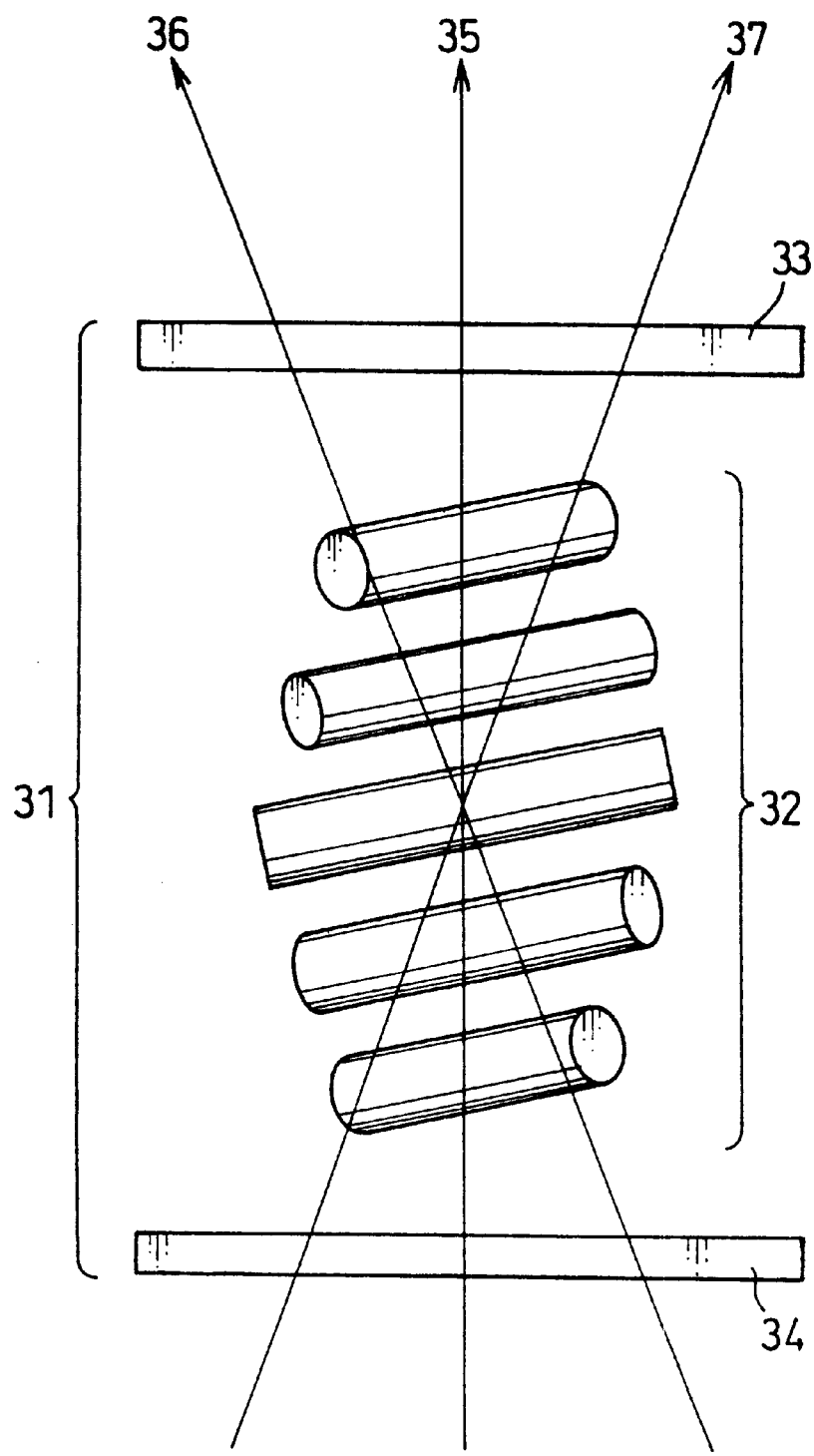
FIG. 11 is a schematic view showing the twisted orientation of liquid crystal molecules in an TN liquid crystal display element.

FIG. 10 shows $\Delta n(\lambda)/\Delta n(550)$ for wavelengths $\lambda$ with a combination of a liquid crystal material that can be used as the liquid crystal layer 8 of the present liquid crystal display device and of optical retardation compensator plates that can be used as the optical retardation compensator plates 2 and 3. The solid curved line <u>a</u> shows $\Delta n_L(\lambda)/\Delta n_L(550)$ for wavelengths $\lambda$ of a liquid crystal material, while the alternative long and short dash line <u>b</u> shows $\Delta n_F(\lambda)/\Delta n_F(550)$ for wavelengths $\lambda$ of an optical retardation compensator plate.

As explained above, the liquid crystal display device of the present embodiment includes, between the liquid crystal display element 1 and the polarizer plates 4 and 5, the optical retardation compensator plates 2 and 3 each represented by a refractive index ellipsoid having three principal refractive indices, na, nb, and nc, mutually related by the inequality na=nc>nb, the refractive index ellipsoid inclining as the direction of the principal refractive index nb parallel to the normal to the surface and the direction of either the principal refractive index na or nc in the surface recline either clockwise or counterclockwise around the direction of the principal refractive index nc or na in the surface, wherein the ratios of the variation in the refractive index anisotropy, $\Delta n_L$, of the liquid crystal material for the liquid crystal layer 8 with the wavelength of light and of the variation in the refractive index anisotropy, $\Delta n_F$, of the optical retardation compensator plate with the wavelength of light are set within such a range that viewing angle dependency does not cause coloration on the liquid crystal screen.

As a result, the coloration phenomenon caused by the viewing angle dependency of the display screen can be, above all, effectively restrained by the compensation function for phase difference that occurs to the liquid crystal display element 1 according to the viewing angle by the setting of the ratios of the variation in the refractive index anisotropy, $\Delta n_L$, of the liquid crystal material for the liquid crystal layer 8 with the wavelength of light and of the variation in the refractive index anisotropy, $\Delta n_F$, of the optical retardation compensator plate with the wavelength of light in the range above, as well as by the compensation function by the optical retardation compensator plates 2 and 3. Besides, the contrast variations and tone reversion phenomenon can be improved, resulting in display of high quality images.

Besides, similarly to the liquid crystal display device of the previous embodiments, by employing as the liquid crystal material for the liquid crystal layer 8 a liquid crystal material of which the refractive index anisotropy, $\Delta n_L(550)$ to light having a wavelength of 550 nm, is designed to be within a range larger than 0.060 and smaller than 0.120, and more preferably, within a range not smaller than 0.070 and not larger than 0.095, the decrease in contrast ratio in the opposite viewing direction and the tone reversion phenomenon in the right—and left hand directions can be further restrained by the compensation function for phase difference by the setting of the ratios of the variations in the range above, as well as by the compensation function by the optical retardation compensator plates 2 and 3. Note that although the liquid crystal display device of Normally White display has been taken as an example in the description above, the same effects can be obtained with a liquid crystal display device of Normally Black display.

Note also that similarly to the first embodiment, apart from the liquid crystal display device of a simple matrix method, the present invention can be applied to a liquid crystal display device of an active matrix method using active switching elements such as TFTs.

The following description will explain examples that substantiate the effects of the liquid crystal display devices of the first, second, and third embodiments.

FIRST EXAMPLE

The present example is to substantiate the effects of the liquid crystal display devices of the first and second embodiments. Here, seven sample cells #1 to #7 were prepared by using Optomer AL (product name), available from Japan Synthetic Rubber Co., Ltd., as the orientation films 11 and 14 of the liquid crystal cell 16 of the liquid crystal display device shown in FIG. 1, selecting suitable liquid crystal materials to set the pretilt angles to 2.0°, 3.0°, 4.0°, 5.0°, 10.0°, 11.0°, and 12.0° with respect to the orientation films 11 and 14, and setting the thickness of the cells of the liquid crystal layers 8 to 5 μm.

Homogeneous cells were prepared by injecting thereinto the materials for the sample cells #1 to #7, and measured with a pretilt angle measuring device, NSMAP-3000LCD (Sigma Optical Machinery Co., Ltd.), for the pretilt angles of the sample cells #1 to #7.

Used as the optical retardation compensator plates 2 and 3 of the sample cells #1 to #7 are those constituted by a transparent support base (e.g., triacetylcellulose (TAC)) on which discotic liquid crystal is applied. The discotic liquid crystal is treated with an oblique orientation technique, and crosslinked. The optical retardation compensator plates 2 and 3 each have resulting first and second retardation values of 0 and 100 nm respectively, a principal refractive index nb inclining by 20° in the direction of arrow A with respect to the z-coordinate axis of the x-, y-, and z-coordinates system, and a principal refractive index nc inclining by 20° in the direction of arrow B with respect to the x-coordinate axis (that is, the inclination angle of the refractive index ellipsoid $\theta=20°$).

Tables 1 to 7 show results of visual observations of the sample cells #1 to #7 under white light with various voltages applied for white tone.

TABLE 1

Applied voltage for white tone set to derive a transmittance 100% that in the OFF state

| Viewing Angle ($\theta$) | Pretilt angle (°) | | | | | | |
|---|---|---|---|---|---|---|---|
| | 2.0 | 3.0 | 4.0 | 5.0 | 10.0 | 11.0 | 12.0 |
| | #1 | #2 | #3 | #4 | #5 | #6 | #7 |
| 50° | $x_1$ | o | o | o | o | o | $x_2$ |
| 60° | $x_1$ | o | o | o | o | o | $x_2$ |
| 70° | $x_1$ | $\Delta_2$ | $\Delta_1$ | o | o | $x_2$ | $x_2$ |

("O" represents that no tone reversion was observed in the opposite viewing direction, "$\Delta_1$" represents that no tone reversion was observed in the opposite viewing direction, but that tone is distorted within the extent that did not pose any problem for real use, "$\Delta_2$" represents that tone reversion was observed in the opposite viewing direction within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Table 1 shows, supposing that the transmittance along the normal to the surface of the liquid crystal cell 16 as 100% in an OFF state where the voltage applied to the liquid crystal layer is zero, results of display conditions when white tone is being displayed by setting a value that derives 100% of the transmittance along the normal for each sample cell.

Table 1 shows that in a case where the voltage when white tone was being displayed was set to cause the ratio of the transmittance when white tone is being displayed to be 100%, the sample cell #4 and #5, having respective pretilt angles of 5.0° and 10.0°, displayed high quality images with no tone reversion being observed in the opposite viewing direction at a viewing angle of 70°.

Up to a viewing angle of 60°, the sample cells #2 and #3, having respective pretilt angles of 3.0° and 4.0°, displayed high quality images with no tone reversion being observed in the opposite viewing direction. At a viewing angle of 70°, tone reversion was observed with the sample cell #2 within the extent that did not pose any problem for real use, and tone was distorted, although not reversed, with the sample cell #3. The sample cells #3 and #4 however did not pose any problem for real use at the viewing angle of 70°.

Up to a viewing angle of 60°, the sample cell #6 with the pretilt angle of 11.0° displayed high quality images. However, at a viewing angle of 70°, a decrease in luminance was evident in the standard viewing direction to the extent unbearable for real use.

With the sample cell #1, having a pretilt angle of 2.0°, tone reversion was observed in the opposite viewing direction at a viewing angle as low as 50°. With the sample cell #7, having a pretilt angle of 12.0°, a decrease in luminance was evident in the standard viewing direction at a viewing angle as low as 50° to the extent unbearable for real use.

TABLE 2

Applied voltage for white tone set to derive a transmittance 97% that in the OFF state

| | Pretilt angle (°) | | | | | | |
|---|---|---|---|---|---|---|---|
| Viewing Angle (θ) | 2.0 | 3.0 | 4.0 | 5.0 | 10.0 | 11.0 | 12.0 |
| | #1 | #2 | #3 | #4 | #5 | #6 | #7 |
| 50° | $x_1$ | ○ | ○ | ○ | ○ | ○ | $x_2$ |
| 60° | $x_1$ | $\Delta_1$ | ○ | ○ | ○ | $x_2$ | $x_2$ |
| 70° | $x_1$ | $x_1$ | ○ | ○ | ○ | $x_2$ | $x_2$ |

("O" represents that no tone reversion was observed in the opposite viewing direction, "$\Delta_1$" represents that no tone reversion was observed in the opposite viewing direction, but that tone is distorted within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Table 2 shows results observed by setting a voltage for white tone for each sample cell to cause the transmittance for white tone to be 97% that in an OFF state.

Table 2 shows that in a case where the voltage when white tone was being displayed was set to cause the ratio of the transmittance when white tone was being displayed to be 97%, the sample cells #3, #4, and #5, having respective pretilt angles of 4.0°, 5.0°, and 10.0°, displayed high quality images with no tone reversion being observed in the opposite viewing direction at a viewing angle of 70°.

Up to a viewing angle of 50°, the sample cell #2, having a pretilt angle of 3.0°, displayed high quality images with no tone reversion being observed in the opposite viewing direction. At a viewing angle of 60°, tone was distorted with the sample cell #2. However, the sample cell #2 did not pose any problem for real use, because tone was not reversed. The sample cell #6 with the pretilt angle of 11.0° displayed high quality images up to a viewing angle of 50°. However, at a viewing angle of 60°, a decrease in luminance was evident in the standard viewing direction to the extent unbearable for real use.

With the sample cell #1, having a pretilt angle of 2.0°, tone reversion was observed in the opposite viewing direction at a viewing angle as low as 50°. With the sample cell #7, having a pretilt angle of 12.0°, a decrease in luminance was evident in the standard viewing direction at a viewing angle as low as 50° to the extent unbearable for real use.

TABLE 3

Applied voltage for white tone set to derive a transmittance 95% that in the OFF state

| | Pretilt angle (°) | | | | | | |
|---|---|---|---|---|---|---|---|
| Viewing Angle (θ) | 2.0 | 3.0 | 4.0 | 5.0 | 10.0 | 11.0 | 12.0 |
| | #1 | #2 | #3 | #4 | #5 | #6 | #7 |
| 50° | $x_1$ | ○ | ○ | ○ | ○ | ○ | $x_2$ |
| 60° | $x_1$ | $\Delta_1$ | ○ | ○ | ○ | $x_2$ | $x_2$ |
| 70° | $x_1$ | $x_1$ | ○ | ○ | ○ | $x_2$ | $x_2$ |

("O" represents that no tone reversion was observed in the opposite viewing direction, "$\Delta_1$" represents that no tone reversion was observed in the opposite viewing direction, but that tone is distorted within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Table 3 shows results observed by setting a voltage for white tone for each sample cell to cause the transmittance to be 95% that in an OFF state. Those results were the same as in Table 2 in which the voltage was set to cause the transmittance for white tone to be 97%.

TABLE 4

Applied voltage for white tone set to derive a transmittance 92% that in the OFF state

| | Pretilt angle (°) | | | | | | |
|---|---|---|---|---|---|---|---|
| Viewing Angle (θ) | 2.0 | 3.0 | 4.0 | 5.0 | 10.0 | 11.0 | 12.0 |
| | #1 | #2 | #3 | #4 | #5 | #6 | #7 |
| 50° | $\Delta_2$ | ○ | ○ | ○ | ○ | ○ | $x_2$ |
| 60° | $x_1$ | ○ | ○ | ○ | ○ | $x_2$ | $x_2$ |
| 70° | $x_1$ | $\Delta_2$ | ○ | ○ | ○ | $x_2$ | $x_2$ |

("O" represents that no tone reversion was observed in the opposite viewing direction, "$\Delta_2$" represents that tone reversion was observed in the opposite viewing direction within the extent that did not pose any problem for real use, "$X_1$" represents that tone reversion was observed in the opposite viewing direction, and "$x_2$" represents that a decrease in luminance was evident in the standard viewing direction to the extent unbearable for real use.)

Table 4 shows results observed by setting a voltage for white tone for each sample cell to cause the ratio of the transmittance for white tone to be 92% that in an OFF state.

Table 4 shows that in a case where the voltage when white tone was being displayed was set to cause the ratio of the transmittance for white tone to be 92%, the sample cells #3, #4, and 190 5, having respective pretilt angles of 4.0°, 5.0°, and 10.0°, displayed high quality images with no tone reversion being observed in the opposite viewing direction at a viewing angle of 70°.

Up to a viewing angle of 60°, the sample cell #2, having a pretilt angle of 3.0°, displayed high quality images with no tone reversion being observed in the opposite viewing direction. At a viewing angle of 70°, tone was reversed with the sample cell #2. However, the tone reversion was within the extent that did not pose any problem for real use. The sample cell #6 with the pretilt angle of 11.0° displayed high quality images up to a viewing angle of 50°. However, at a viewing angle of 60°, a decrease in luminance was evident in the standard viewing direction to the extent unbearable for real use. Tone reversion was observed at a viewing angle of 50° with the sample cell #1, having a pretilt angle of 2.0°, within the extent that did not pose any problem for real use.

With the sample cell #7, having a pretilt angle of 12.0°, a decrease in luminance was evident in the standard viewing direction at a viewing angle as low as 50° to the extent unbearable for real use.

TABLE 5

Applied voltage for white tone set to derive a transmittance
90% that in the OFF state

| | Pretilt angle (°) | | | | | | |
|---|---|---|---|---|---|---|---|
| Viewing Angle (θ) | 2.0 | 3.0 | 4.0 | 5.0 | 10.0 | 11.0 | 12.0 |
| | #1 | #2 | #3 | #4 | #5 | #6 | #7 |
| 50° | $\Delta_1$ | ○ | ○ | ○ | ○ | $\Delta_3$ | $x_2$ |
| 60° | $\Delta_2$ | ○ | ○ | ○ | $\Delta_3$ | $x_2$ | $x_2$ |
| 70° | $x_1$ | $\Delta_1$ | ○ | ○ | $x_2$ | $x_2$ | $x_2$ |

("O" represents that no tone reversion was observed in the opposite viewing direction, "$\Delta_1$" represents that no tone reversion was observed in the opposite viewing direction, but that tone is distorted within the extent that did not pose any problem for real use, "$\Delta_2$" represents that tone reversion was observed in the opposite viewing direction within the extent that did not pose any problem for real use, "$\Delta_3$" represents that a decrease in luminance was observed in the standard viewing direction within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Table 5 shows results observed by setting a voltage for white tone for each sample cell to cause the ratio of the transmittance for white tone to be 90% that in an OFF state.

Table 5 shows that in a case where the voltage when white tone was being displayed was set to cause the ratio of the transmittance when white tone was being displayed to be 90%, the sample cells #3 and #4, having respective pretilt angles of 4.0° and 5.0°, displayed high quality images with no tone reversion being observed in the opposite viewing direction at a viewing angle of 70°.

Up to a viewing angle of 50°, the sample cell #5, having a pretilt angle of 10.0°, displayed high quality images. At a viewing angle of 60°, a decrease in luminance was observed in the standard viewing direction within the extent that did not pose any problem for real use. Up to a viewing angle of 60°, the sample cell #2, having a pretilt angle of 3.0°, displayed high quality images with no tone reversion being observed even in the opposite viewing direction. At a viewing angle of 70°, tone was distorted within the extent that did not pose any problem for real use, but no tone reversion was observed. With the sample cell #6 with the pretilt angle of 11.0°, a decrease in luminance was observed in the standard viewing direction at a viewing angle of 50° within the extent that did not pose any problem for real use. With the sample cell #1, having a pretilt angle of 2.0°, tone was distorted at a viewing angle of 50° and reversed at a viewing angle of 60° within the extent that did not pose any problem for real use.

With the sample cell #7, having a pretilt angle of 12.0°, a decrease in luminance was evident in the standard viewing direction at a viewing angle as low as 50° to the extent unbearable for real use.

TABLE 6

Applied voltage for white tone set to derive a transmittance
87% that in the OFF state

| | Pretilt angle (°) | | | | | | |
|---|---|---|---|---|---|---|---|
| Viewing Angle (θ) | 2.0 | 3.0 | 4.0 | 5.0 | 10.0 | 11.0 | 12.0 |
| | #1 | #2 | #3 | #4 | #5 | #6 | #7 |
| 50° | ○ | ○ | ○ | ○ | $\Delta_3$ | $x_2$ | $x_2$ |
| 60° | $\Delta_3$ | $\Delta_3$ | $\Delta_3$ | $\Delta_3$ | $\Delta_3$ | $x_2$ | $x_2$ |
| 70° | $x_2$ | $x_2$ | $x_2$ | $x_2$ | $x_2$ | $x_2$ | $x_2$ |

("O" represents that no tone reversion was observed in the opposite viewing direction, "$\Delta_3$" represents that a decrease in luminance was observed in the standard viewing direction within the extent that did not pose any problem for real use, and "$x_2$" represents that a decrease in luminance was evident in the standard viewing direction to the extent unbearable for real use.)

Table 6 shows results observed by setting a voltage for white tone for each sample cell to cause the ratio of the transmittance for white tone to be 87% that in an OFF state.

Table 6 shows that in a case where the voltage when white tone was being displayed was set to cause the ratio of the transmittance when white tone was being displayed to be 87%, the sample cells #2, #3, and #4, having respective pretilt angles of 3.0°, 4.0° and 5.0°, displayed high quality images up to a viewing angle of 50°. However, at a viewing angle of 60°, a decrease in luminance was observed in the standard viewing direction within the extent that did not pose any problem for real use. At a viewing angle of 70°, a decrease in luminance was evident in the standard viewing direction to the extent unbearable for real use.

At viewing angles of 50° and 60°, a decrease in luminance was observed with the sample cell #5, having a pretilt angle of 10.0°, in the standard viewing direction within the extent that did not pose any problem for real use. At a viewing angle of 70°, a decrease in luminance was evident in the standard viewing direction to the extent unbearable for real use.

With the sample cells #6 and #7, having respective pretilt angles of 11.0° and 12.0°, a decrease in luminance was evident in the standard viewing direction at a viewing angle as low as 50° to the extent unbearable for real use.

Up to a viewing angle of 50°, the sample cell #1, having a pretilt angle of 2.0°, displayed high quality images with no tone reversion being observed in the opposite viewing direction. However, at a viewing angle of 60°, a decrease in luminance was observed in the standard viewing direction within the extent that did not pose any problem for real use. At a viewing angle of 70°, a decrease in luminance was evident in the standard viewing direction to the extent unbearable for real use.

TABLE 7

Applied voltage for white tone set to derive a transmittance
85% that in the OFF state

| | Pretilt angle (°) | | | | | | |
|---|---|---|---|---|---|---|---|
| Viewing Angle (θ) | 2.0 | 3.0 | 4.0 | 5.0 | 10.0 | 11.0 | 12.0 |
| | #1 | #2 | #3 | #4 | #5 | #6 | #7 |
| 50° | $\Delta_3$ | $x_3$ | $x_3$ | $x_3$ | $x_3$ | $x_3$ | $x_3$ |
| 60° | $x_3$ | $x_3$ | $x_3$ | $x_3$ | $x_3$ | $x_3$ | $x_3$ |
| 70° | $x_3$ | $x_3$ | $x_3$ | $x_3$ | $x_3$ | $x_3$ | $x_3$ |

("$\Delta_3$" represents that a decrease in luminance was observed in the standard viewing direction within the extent that did not pose any problem for real use, and "$x_3$" represents that a decrease in luminance was evident in the standard viewing direction and in the right- and left-hand directions to the extent unbearable for real use.)

Table 7 shows results observed by setting a voltage for white tone for each sample cell to cause the ratio of the transmittance for white tone to be 85% that in an OFF state.

Table 7 shows that in a case where the voltage when white tone was being displayed was set to cause the ratio of the transmittance when white tone was being displayed to be 85%, a decrease in luminance was evident with the sample cells #2, #3, #4, #5, #6, and #7, having respective pretilt angles of 3.0°, 4.0° 5.0°, 10.0°, 11.0° and 12.0°, in the standard viewing direction and in the right—and left-hand directions at a viewing angle as low as 50° to the extent unbearable for real use.

At a viewing angle of 50°, a decrease in luminance was observed with the sample cell #1, having a pretilt angle of 2.0°, in the standard viewing direction within the extent that did not pose any problem for real use. At a viewing angle of 60°, a decrease in luminance was evident in the standard viewing direction to the extent unbearable for real use.

It can be concluded from Tables 1 to 7 that tone reversion can be restrained in the opposite viewing direction by adjusting the pretilt angle or the transmittance when white tone is being displayed. It can be also concluded that in such an event, at a value ranging from 95% to 97% to which the ratio of the transmittance is normally set as the transmittance for white tone, the setting of the pretilt angle in a range larger than 2° and smaller than 12° permits high quality images to be displayed at a viewing angle of 50° with tone reversion being restrained in the opposite viewing direction and no decrease in luminance being observed in the standard viewing direction. It can be further concluded that the setting of the pretilt angle in a range not less than 4° and not more than 10° permits high quality images to be displayed at a wide viewing angle of 70° with tone reversion being restrained in the opposite viewing direction and no decrease in luminance being observed in the standard viewing direction.

Moreover, it can be concluded that at a pretilt angle of 2° to 10°, to which the pretilt angle is normally set, such setting that a transmittance not higher than 85% is derived as the transmittance when white tone is being displayed permits high quality images to be displayed at a viewing angle of 50° with tone reversion being restrained in the opposite viewing direction and no decrease in luminance being observed in the standard viewing direction. It can be also concluded that such setting that a transmittance within a range not less than 90% and not more than 97% is derived, plus the adjustment of the pretilt angle, permits high quality images to be displayed at a wide viewing angle of 70° with tone reversion being restrained in the opposite viewing direction and no decrease in luminance being observed in the standard viewing direction.

Moreover, it can be concluded that a combination of the adjustment of the pretilt angle and that of the transmittance when white tone is being displayed further enhances the effects of improvement.

Figure 6:
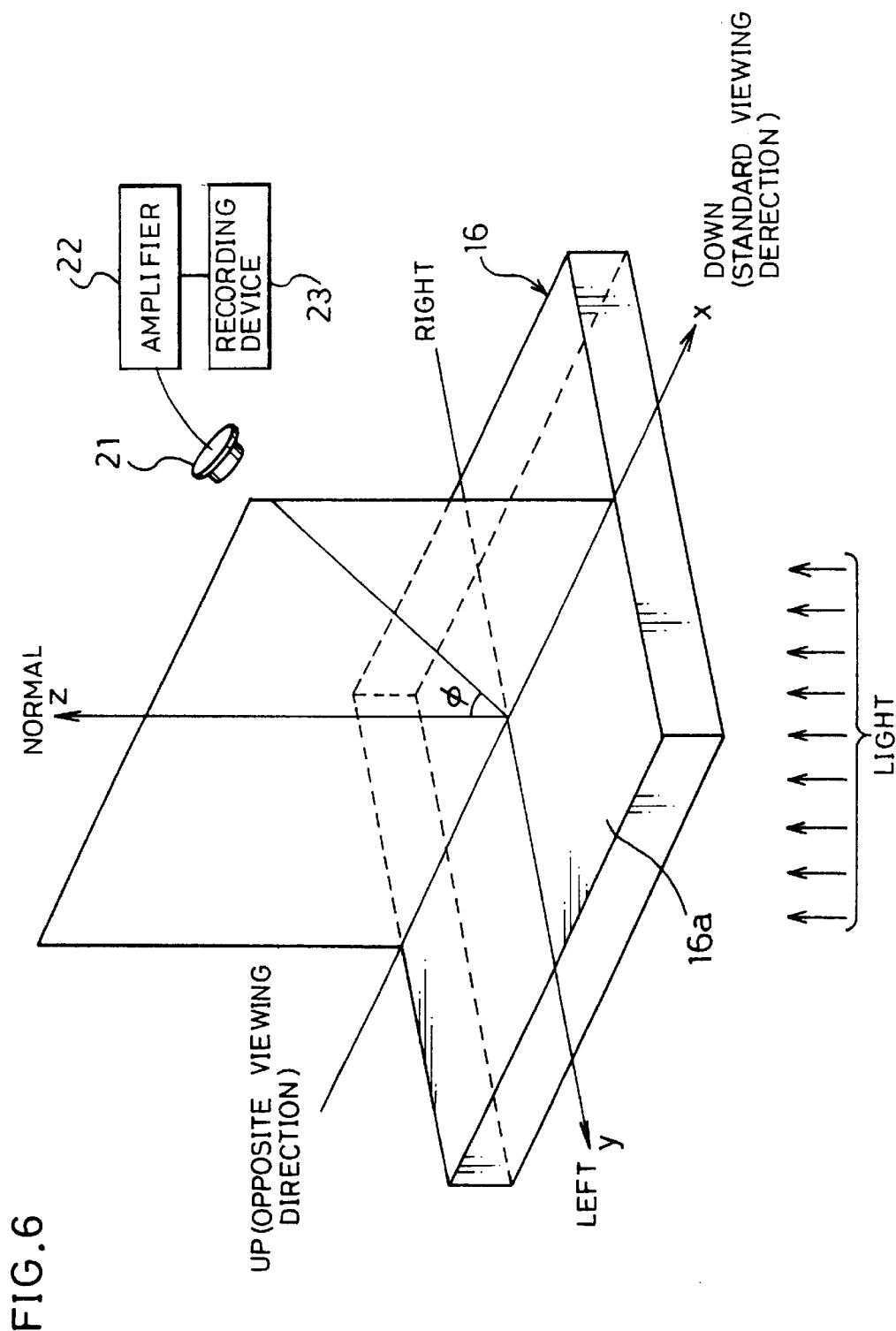
FIG. 6 is a perspective view showing a system for measuring the viewing angle dependency of the liquid crystal display device.

Next, viewing angle dependency of the liquid crystal display device was checked with the same samples #1 and #4 as above by using a measuring system including a light receiving element 21, an amplifier 22, and a recording device 23 as shown in FIG. 6.

In this measuring system, the liquid crystal cell 16 of the liquid crystal display device is placed so that the surface 16a facing the glass substrate 9 lies on the reference plane X—Y of the rectangular coordinates XYZ. The light receiving element 21 is an element capable of receiving light at a certain solid light receiving angle, and is located a predetermined distance away from the original point of the coordinates at an angle (viewing angle) of ϕ with respect to the Z-direction orthogonal to the plane 16a.

Upon measurement, monochromatic light having a wavelength of 550 nm is emitted from the surface opposite the plane 16a to irradiate the liquid crystal cell 16 is the measuring system. Part of the monochromatic light having passed through the liquid crystal cell 16 enters the light receiving element 21. Output by the light receiving element 21 is amplified to a predetermined level by the amplifier 22, and recorded in the recording device 23, such as a waveform memory or a recorder.

Here, the output level by the light receiving element 21 in response to the applying of voltage to the sample cells #1 and #4 was measured with the light receiving element 21 being fixed at a certain angle ϕ.

The measurement was done, assuming that and Y-direction is the left-hand side of the screen and the X-direction is the downward direction (standard viewing direction) of the screen, while disposing the light receiving element 21 in the upward direction (opposite viewing direction), the downward direction (standard viewing direction), and the right- and left-hand directions with the angle ϕ being maintained at 50°.

Figure 7A:
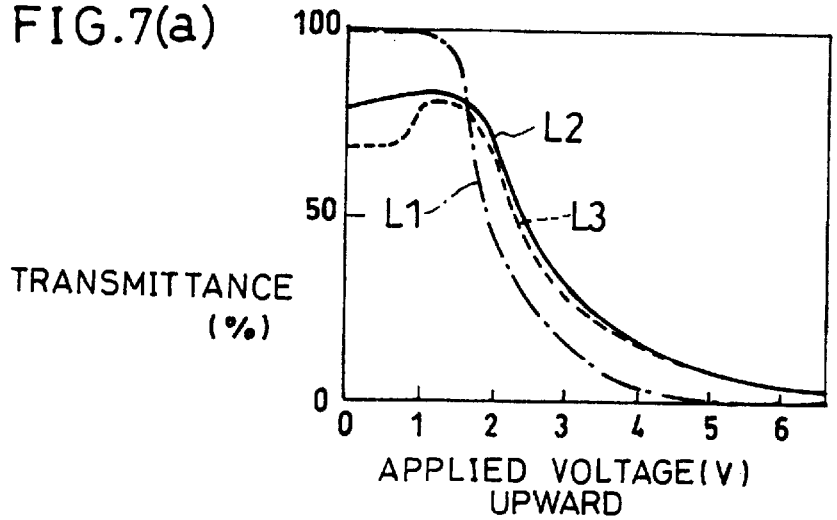
FIGS. 7(a), 7(b), and 7(c) are graphs showing the transmittance versus liquid crystal applied voltage characteristics of the liquid crystal display devices of the first example and a comparative example for the first example.
Figure 7B:
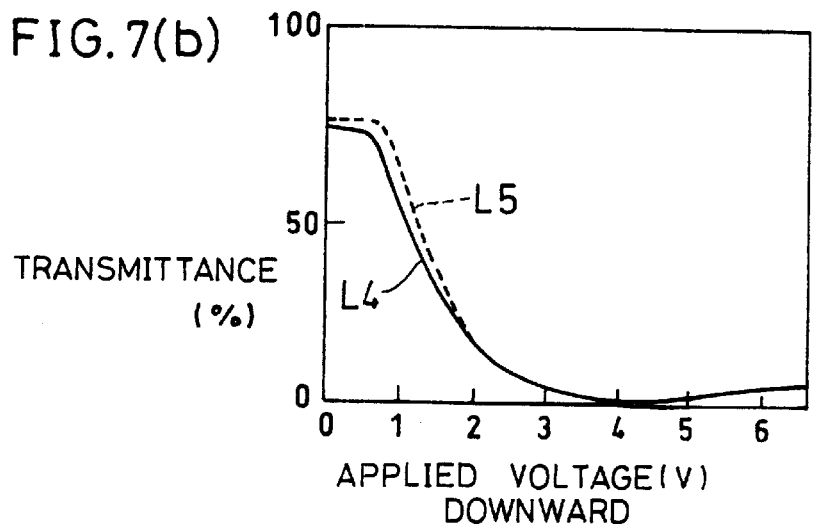
Figure 7C:
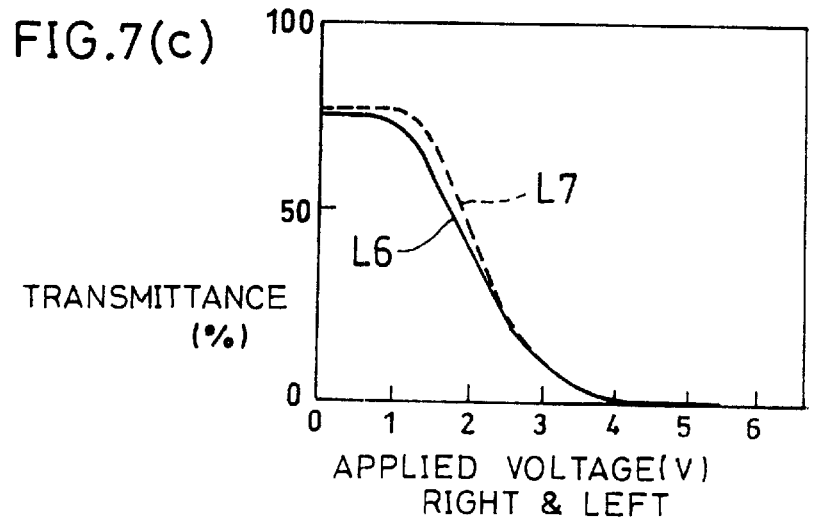

Graphs in FIGS. 7(a) to 7(c) show results, illustrating the behavior of the light transmittances of the sample cells #4 and #1, having respective pretilt angles of 5.0° and 2.0°, in response to voltage applied thereto, that is, the transmittance versus liquid crystal applied voltage characteristics.

FIG. 7(a) shows results of the measurement from the upward direction in FIG. 2. FIG. 7(b) shows results of the measurement from the downward direction in FIG. 2. FIG. 7(c) shows results of the measurement form the right—and left-hand directions in FIG. 2.

Referring to FIG. 7(a), the curved alternative long and short dash line L1 represents results of measurement in the front direction, i.e. the direction normal to the surface. Both the sample cell #1 and the sample cell #4 exhibit the same transmittance versus liquid crystal applied voltage characteristics.

Referring to FIGS. 7(a) to 7(c), the solid lines L2, L4, and L6 represent the sample cell #4, and the dotted lines L3, L5, and L7 represent the sample #1.

To compare the sample cell #4 with the sample cell #1 in terms of transmittance versus liquid crystal applied voltage characteristics in the upward direction in FIG. 7(a), the curved line L3 for the sample cell #1 has a bumpy shape, or rise and fall of the transmittance, between about 1 V and 2 V. By contrast, the curved line L2 for the sample cell #4 is flat between about 1 V and 2 V with the transmittance staying at a value, and has no bumpy shape, showing that the sample cell #4 is free from the tone reversion phenomenon.

To compare those sample cells in terms of transmittance versus liquid crystal applied voltage characteristics in the downward, left-hand, and right-hand directions in FIGS. 7(b) and 7(c), the curved lines L4 and L6 for the sample cell #4 and the curved lines L5 and L7 for the sample cell #1 show that the transmittance of the sample cell #4 drops a little more quickly than that of the sample cell #1. However, the transmittance of the sample cell #4 starts to conform to that of the sample cell #1 at around 2.5 V in FIG. 7(b) and at around 3 v in FIG. 7(c). Therefore, it can be confirmed that the larger pretilt angle equaling 5.0° has no adverse effects.

The same results were obtained with sample cells prepared in the same manner as the sample cells #1 to #7 except that those sample cells each include optical retardation compensator plates 2 and 3 composed of discotic liquid crystal treated with hybrid orientation on a transparent support base.

SECOND EXAMPLE

The present example is to substantiate the effects of the liquid crystal display devices in accordance with the first to third embodiments. Here, three sample cells #16 to #18 were prepared by using Optomer AL (produce name), available from Japan Synthetic Rubber Co., Ltd., as the orientation films 11 and 14 of the liquid crystal cell 16 of the liquid crystal display device shown in FIG. 1, using as the liquid crystal layer 8 liquid crystal materials of which the pretilt angle is 3° and of which the refractive index anisotropies $\Delta n_L(550)$ at a wavelength of 550 nm are 0.070, 0.080, and 0.095 respectively, and setting the thickness of the cells (of the liquid crystal layers 8) to 5 μm.

In the same manner as in the previous example, homogeneous cells were prepared by injecting thereinto the materials for the sample cells #16 to #18, and measured with a pretilt angle measuring device, NSMAP-3000LCD, for the pretilt angles of the sample cells #16 to #18.

Used as the optical retardation compensator plates 2 and 3 of the sample cells #16 to #18 are the optical retardation compensator plates 2 and 3 of the same kind as those in the first example above including discotic liquid crystal treated with an oblique orientation technique.

The same measuring system as that in the first example above shown in FIG. 6 was used to measure the output level by the light receiving element 21 in response to the applying of voltage to the sample cells #16 to #18 with the light receiving element 21 being fixed at a certain angle φ.

The measurement was done, assuming that the Y-direction is the left-hand side of the screen and the X-direction is the downward direction (standard viewing direction) of the screen, while disposing the light receiving element 21 in the upward direction (opposite viewing direction), the downward direction (standard viewing direction), and the right- and left-hand directions with the angle φ being maintained at 50°.

Figure 8A:
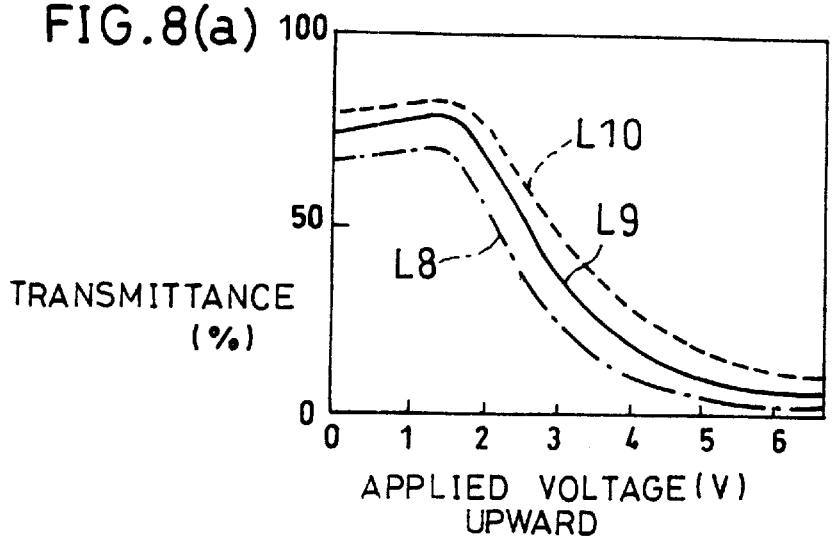
FIGS. 8(a), 8(b), and 8(c) are graphs showing the transmittance versus liquid crystal applied voltage characteristics of the liquid crystal display devices of the second example.
Figure 8B:
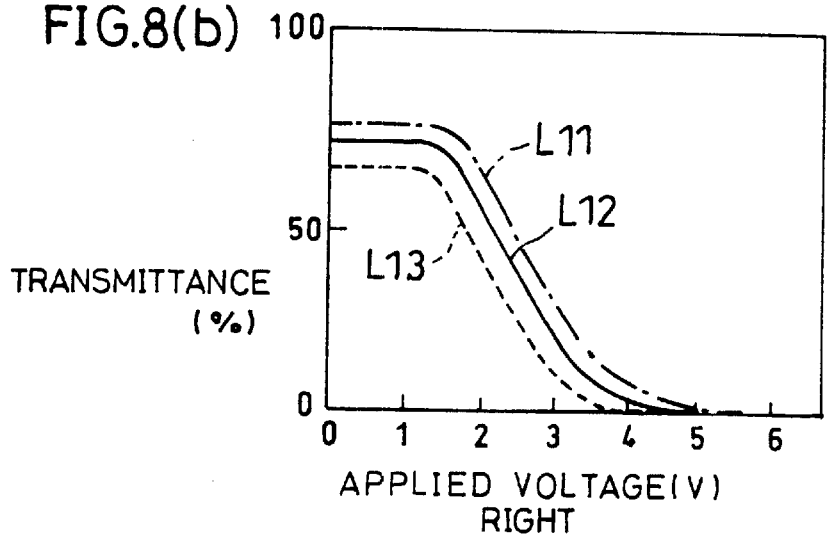
Figure 8C:
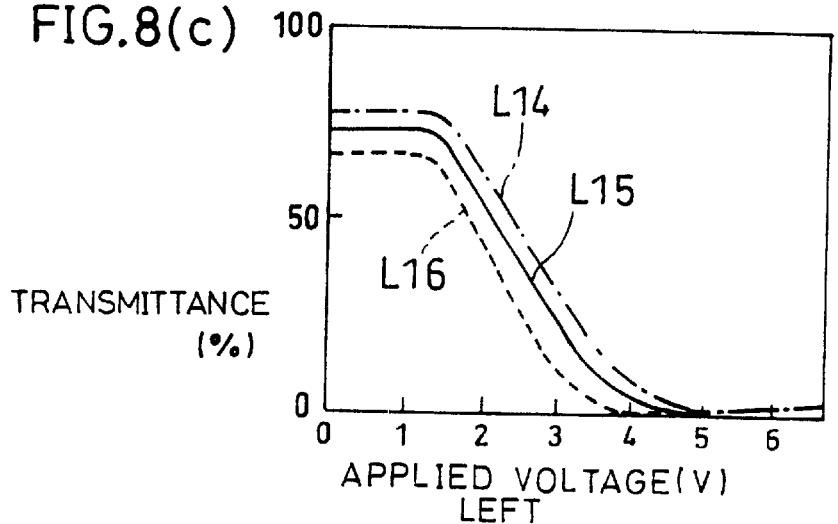

Graphs in FIGS. 8(a) to 8(c) show results, illustrating the behavior of light transmittance of the sample cells #16 to #18 in response to voltage applied thereto, that is, the transmittance versus liquid crystal applied voltage characteristics.

FIG. 8(a) shows results of the measurement from the upward direction in FIG. 2. FIG. 8(b) shows results of the measurement from the right-hand direction in FIG. 2. FIG. 8(c) shows results of the measurement from the left-hand direction in FIG. 2.

Referring to FIGS. 8(a) to 8(c), the curved alternative long and short dash lines L8, L11, and L4 represent the sample cell #16 using a liquid crystal material of $\Delta n_L(550)=$ 0.070 for the liquid crystal layer 8, the solid lines L9, L12, and L15 represent the sample cell #17 using a liquid crystal material of $\Delta n_L(550)=0.080$ for the liquid crystal layer 8, and the dotted lines L10, L13, and L16 represent the sample cell #18 using a liquid crystal material of $\Delta n_L(550)=0.095$ for the liquid crystal layer 8.

Two comparative sample cells #103 and #104 were also prepared as a comparative example for the present example in the same manner as the sample cells of the present example except that those comparative sample cells use liquid crystal materials of which the refractive index anisotropies $\Delta n_L(550)$ at a wavelength of 550 nm are 0.060 and 0.120 as the liquid crystal layer 8 of the liquid crystal cell 16 shown in FIG. 1. The measuring system shown in FIG. 6 was used to measure the output level by the light receiving element 21 in response to the applying of voltage to the comparative sample cells #103 and #104 with the light receiving element 21 being fixed at a certain angle φ in the same manner as in the present example.

The measurement was done, assuming that the Y-direction is the left-hand side of the screen and the X-direction is the downward direction (standard viewing direction) of the screen, while disposing the light receiving element 21 in the upward direction (opposite viewing direction) and the right- and left-hand directions with the angle φ being maintained at 50°.

Figure 9A:
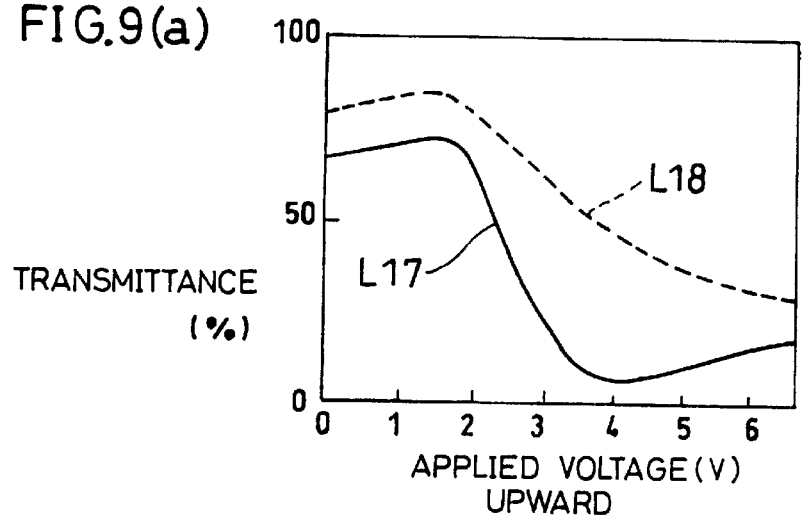
FIGS. 9(a), 9(b), and 9(c) are graphs showing the transmittance versus liquid crystal applied voltage characteristics of the liquid crystal display devices of a comparative example for the second example.
Figure 9B:
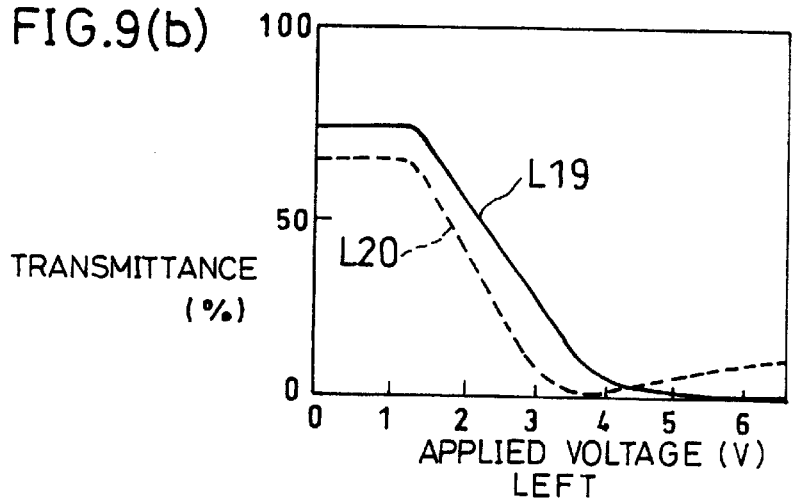
Figure 9C:
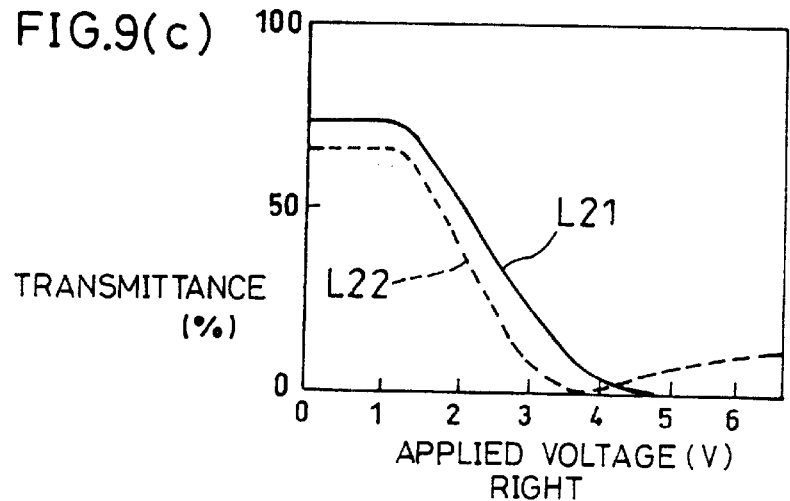

Graphs in FIGS. 9(a) to 9(c) show results, illustrating the behavior of light transmittance of the comparative sample cells #103 to #104 in response to voltage applied thereto, that is, the transmittance versus liquid crystal applied voltage characteristics.

FIG. 9(a) shows results of the measurement from the upward direction in FIG. 2. FIG. 9(b) shows results of the measurement from the right-hand direction in FIG. 2. FIG. 9(c) shows results of the measurement from the left-hand direction in FIG. 2.

Referring to FIGS. 9(a) to 9(c), the solid curved lines L17, L19, and L21 represent the comparative sample cell #103 using a liquid crystal material having $\Delta n_L(550)$ of 0.060 for the liquid crystal layer 8, and the dotted curved lines L18, L20, and L22 represent the comparative sample cell #104 using a liquid crystal material having $\Delta n_L(550)$ of 0.120 for the liquid crystal layer 8.

To compare the sample cells #16 to #18 and the comparative sample cells #103 and #104 in terms of transmittance versus liquid crystal applied voltage characteristics in the upward direction in FIGS. 8(a) and 9(a), the curved lines L9, L8, and L10 show that the transmittances drop by sufficient amounts with higher voltages. By contrast, in comparison with the curved lines L8, L9, and L10, the curved line L18 shows that the transmittance does not drop sufficiently with higher voltages, and the curved line L17 shows that the transmittance drops and then rises with higher voltages, resulting in tone reversion phenomenon.

To compare the sample cells #16 to #18 and the comparative sample cells #103 and #104 in terms of transmittance versus liquid crystal applied voltage characteristics in the right-hand direction in FIGS. 8(b) and 9(b), the curved lines L11, L12, and L13 show that the transmittances drop almost to zero with higher voltages. The curved line L19 shows that the transmittance drops almost to zero with higher voltages as in FIG. 8(b), while the curved line L20 shows that tone reversion phenomenon occurs.

The same results as in the right-hand direction were obtained in the left-hand direction with the sample cells #16 to #18 and the comparative sample cells #103 and #104.

Visual observations were conducted of the sample cells #16 to #18 and the comparative sample cells #103 and #104 under white light.

The sample cells #16 to #18 and the comparative sample cell #103 showed coloration in no direction at a viewing angle of 50°, displaying good images. By contrast, the comparative sample cell #104 showed coloration ranging from yellow to orange in the right- and left-hand directions at a viewing angle of 50°.

It can be concluded from those results shown in FIGS. 8(a) to 8(c) that if the liquid crystal layer 8 is made of a liquid crystal material of which the refractive index anisotropy $\Delta n_L(550)$ at a wavelength of 550 nm is 0.070, 0.080, or 0.095, the transmittance drops by a sufficient amount with higher voltages, thereby shows no tone reversion phenomenon, expanding the effective viewing angle, and shows no coloration phenomenon, greatly improving the display quality of the liquid crystal display device.

It can be concluded, on the other hand, from those results in FIGS. 9(a) to 9(c) that if the liquid crystal layer 8 is made of a liquid crystal material of which the refractive index anisotropy $\Delta n_L(550)$ at a wavelength of 550 nm is 0.060 or 0.120, the viewing angle dependency is not restrained satisfactorily.

The same results were obtained with sample cells and comparative sample cells prepared in the same manner as the sample cells #16 to #18 and the comparative sample cells #103 and #104 except that those sample cells and comparative sample cells include optical retardation compensator plates 2 and 3 composed of discotic liquid crystal treated with hybrid orientation on a transparent support base.

The transmittance versus liquid crystal applied voltage characteristics were examined for the dependency thereof upon the inclination angle θ of the refractive index ellipsoid of the optical retardation compensator plates 2 and 3, by varying the inclination angle θ. The results were such that the transmittance versus liquid crystal applied voltage characteristics remained virtually unchanged irrelevant to the orientation state of the discotic liquid crystal of the optical retardation compensator plates 2 and 3, as long as the inclination angle θ stayed in the range of $15° \leq θ \leq 75°$. It was also observed that when the inclination angle θ was varied out of that range, the effective viewing angle did not become wider in the opposite viewing direction.

The transmittance versus liquid crystal applied voltage characteristics were examined for the dependency thereof upon the second retardation value of the optical retardation compensator plates 2 and 3, by varying the second retardation value. The results were such that the transmittance versus liquid crystal applied voltage characteristics remained virtually unchanged irrelevant to the orientation state of the discotic liquid crystal of the optical retardation compensator plates 2 and 3, as long as the second retardation value stayed in the range of 80 nm to 250 nm. It was also observed that when the second retardation value was varied out of that range, the effective viewing angle did not become wider in the opposite viewing direction.

In light of the results of the visual observations of the comparative sample cells #103 and #104, three sample cells #19 to #21 were prepared in the same manner as in the present example except that the sample cells #19 to #21 used liquid crystal materials of which the refractive index anisotropies $\Delta n_L(550)$ at a wavelength of 550 nm are 0.065, 0.100, and 0.115 as the liquid crystal layer 8 of the liquid crystal cell 16 shown in FIG. 1. The measuring system shown in FIG. 6 was used to measure the output level by the light receiving element 21 in response to the applying of voltage to the sample cells #19 to #21 with the light receiving element 21 being fixed at a certain angle φ in the same manner as in the present example. Visual observations were also conducted of the sample cells #19 to #21 under white light.

The results show that the transmittance of the sample cell #20 with the refractive index anisotropy $\Delta n_L(550)$ of 0.100 and that of the sample cell #21 with the refractive index anisotropy $\Delta n_L(550)$ of 0.115 rose slightly with higher voltages in the right- and left-hand directions with the angle φ of 50°. However, no tone reversion phenomenon was visually confirmed, and those rises in the transmittance were within the extent that did not pose any problem for real use. The results show no problem at all in the upward direction. Meanwhile, similarly to the transmittance of the aforementioned comparative sample cell #103, the transmittance of the sample cell #19 with the refractive index anisotropy $\Delta n_L(550)$ of 0.065 dropped slightly and then rose with higher voltages in the upward direction. However, the rise in the transmittance was relatively small as compared with that of the comparative sample cell #103 shown in FIG. 9(a), being within the extent that did not pose any problem for real use. The results show no problem at all in the right- and left-hand directions.

Visual observation discovered slight coloration ranging from yellow to orange with the sample cells #20 and #21, however, within the extent that did not pose any problem for real use. Visual observation also discovered slight bluish coloration with the sample cell #19, however, within the extent that did not pose any problem for real use.

As a supplement, the sample cell #19 and the comparative sample cell #103 were measured for transmittance when white tone was being displayed in the direction normal to the surface of the liquid crystal cell 16, by applying a voltage of about 1 V. The results show that the transmittance of the comparative sample cell #103 dropped to the extent unbearable for real use, while the transmittance of the sample cell #19 dropped slightly, however, within the extent that did not pose any problem for real use.

The same results were obtained in a case where Optomer AL (product name), available from Japan Synthetic Rubber Co., Ltd., was used as the orientation films 11 and 14 of the liquid crystal cell 16 of the liquid crystal display device shown in FIG. 1, and liquid crystal materials that formed pretilt angles of 4°, 5°, 10°, and 11° to the orientation films 11 and 14 were used as the liquid crystal layer 8.

THIRD EXAMPLE

The present example is to substantiate the effects of the liquid crystal display device in accordance with the third embodiment. Here, five sample cells #31 to #35 were prepared by using, as the liquid crystal layer 8 of the liquid crystal cell 16 of the liquid crystal display device shown in FIG. 1, liquid crystal materials and optical retardation compensator plates of which the relations described in the expression (1) were set to 0, 0.15, 0.25, 0.30, and 0.33 respectively, and setting the thickness of the cells (of the liquid crystal layers 8) to 5 μm, the relation concerning the refractive index anisotropy $\Delta n_L(450)$ of the liquid crystal layer 8 at a wavelength of 450 nm, the refractive index anisotropy $\Delta n_L(550)$ thereof at a wavelength of 550 nm, the refractive index anisotropy $\Delta n_F(450)$ of the optical retardation compensator plates 2 and 3 at a wavelength of 450 nm, the refractive index anisotropy $\Delta n_F(550)$ thereof at a wavelength of 550 nm.

$$\frac{(\Delta n_L(450)/\Delta n_L(550))-1}{(\Delta n_F(450)/\Delta n_F(550))-1} \qquad (1)$$

Used as the optical retardation compensator plates 2 and 3 of the sample cells #31 to #35 are those constituted by a transparent support base (e.g., triacetylcellulose (TAC)) on which discotic liquid crystal is applied. The discotic liquid crystal is treated with an oblique orientation technique, and crosslinked. The optical retardation compensator plates 2 and 3 each have resulting first and second retardation values of 0 and 100 nm respectively, a principal refractive index nb inclining by 20° in the direction of arrow A with respect to the z-coordinate axis of the x-, y-, and z-coordinates system, and a principal refractive index nc inclining by 20° in the direction of arrow B with respect to the x-coordinate axis (that is, the inclination angle of the refractive index ellipsoid θ=20°).

As a comparative example for the present example, comparative sample cells #301 to #303 were also prepared in the same manner as the present example except that liquid crystal materials and optical retardation compensator plates of which the relations described in the expression (1) equaled 0.35, 1.0, and 1.1 were used as the liquid crystal layer 8 of the liquid crystal cell 16 of the liquid crystal display device shown in FIG. 1.

Table 8 shows results of visual observations of the sample cells #31 to #35 and the comparative sample cells #301 to #303 under white light.

TABLE 8

| | $\frac{\Delta n_L(450)/\Delta n_L(550)-1}{\Delta n_F(450)/\Delta n_F(550)-1}$ | | | | | | | |
|---|---|---|---|---|---|---|---|---|
| Viewing Angle (θ) | 0 #31 | 0.15 #32 | 0.25 #33 | 0.30 #34 | 0.33 #35 | 0.35 #301 | 1.0 #302 | 1.1 #303 |
| 50° | ○ | ○ | ○ | ○ | ○ | x | x | x |
| 60° | ○ | ○ | ○ | Δ | x | x | x | x |
| 70° | ○ | ○ | ○ | x | x | x | x | x |

("○" represents no coloration, "Δ" represents coloration within the extent that did not pose any problem for real use, and "x" represents coloration to the extent unbearable for real use.)

("○" represents no coloration, "Δ" represents coloration within the extent that did not pose any problem for real use, and "x" represents coloration to the extent unbearable for real use.)

The sample cells #31 to #33 displayed good images with coloration being observed in no direction at a viewing angle of 70°. The sample cell #34 displayed good images with coloration being observed in no direction at viewing angles up to 50°, however, displaying slight coloration within the extent that did not pose any problem for real use in the right- and left-hand directions at a viewing angle of 60°. The sample cell #35 displayed good images with coloration being observed in no direction at viewing angles up to 50°, however, displaying coloration to the extent unbearable for real use in the right- and left-hand directions at a viewing angle of 60°.

By contrast, the comparative sample cells #301 to #303 displayed coloration ranging from yellow to orange to the extent unbearable for real use in the right- and left-hand directions at a viewing angle as low as 50°.

The same results were obtained with sample cells and comparative sample cells prepared in the same manner as the sample cells #31 to #35 and the comparative sample cells #301 and #303 except that those sample cells and comparative sample cells included optical retardation compensator plates 2 and 3 composed of discotic liquid crystal treated with hybrid orientation on a transparent support base.

FOURTH EXAMPLE

The present example is to substantiate the effects of the liquid crystal display device in accordance with the third embodiment. Here, five sample cells #41 to #45 were prepared by using, as the liquid crystal layer 8 of the liquid crystal cell 16 of the liquid crystal display device shown in FIG. 1, liquid crystal materials and optical retardation compensator plates of which the relations described in the expression (2) were set to 0, 0.10, 0.20, 0.23, and 0.25 respectively, and setting the thickness of the cells (of the liquid crystal layers 8) to 5 μm, the relation concerning the refractive index anisotropy $\Delta n_L(550)$ of the liquid crystal layer 8 at a wavelength of 550 nm, the refractive index anisotropy $\Delta n_L(650)$ thereof at a wavelength of 650 nm, the refractive index anisotropy $\Delta n_F(550)$ of the optical retardation compensator plates 2 and 3 at a wavelength of 550 nm, the refractive index anisotropy $\Delta n_F(650)$ thereof at a wavelength of 650 nm.

$$\frac{1-(\Delta n_L(650)/\Delta n_L(550))}{1-(\Delta n_F(650)/\Delta n_F(550))} \qquad (2)$$

Used as the optical retardation compensator plates 2 and 3 of the sample cells #41 to #45 are those constituted by a transparent support base (e.g., triacetylcellulose (TAC)) on which discotic liquid crystal is applied. The discotic liquid crystal is treated with an oblique orientation technique, and crosslinked. The optical retardation compensator plates 2 and 3 each have resulting first and second retardation values of 0 and 100 nm respectively, a principal refractive index nb inclining by 20° in the direction of arrow A with respect to the z-coordinate axis of the x-, y-, and z-coordinates system, and a principal refractive index nc inclining by 20° in the direction of arrow B with respect to the x-coordinate axis (that is, the inclination angle of the refractive index ellipsoid θ=20°).

As a comparative example for the present example, comparative sample cells #401 to #403 were also prepared in the same manner as the present example except that liquid crystal materials and optical retardation compensator plates of which the relations described in the expression (2) equaled 0.27, 1.0, and 1.1 were used as the liquid crystal layer 8 of the liquid crystal cell 16 of the liquid crystal display device shown in FIG. 1.

Table 9 shows results of visual observations of the sample cells #41 to #45 and the comparative sample cells #401 to #403 under white light.

TABLE 9

| | $\frac{1-\Delta n_L(650)/\Delta n_L(550)}{1-\Delta n_F(650)/\Delta n_F(550)}$ | | | | | | | |
|---|---|---|---|---|---|---|---|---|
| Viewing Angle (θ) | 0 #41 | 0.10 #42 | 0.20 #43 | 0.23 #44 | 0.25 #45 | 0.27 #401 | 1.0 #402 | 1.1 #403 |
| 50° | ○ | ○ | ○ | ○ | ○ | x | x | x |
| 60° | ○ | ○ | ○ | Δ | x | x | x | x |
| 70° | ○ | ○ | ○ | x | x | x | x | x |

("○" represents no coloration, "Δ" represents coloration within the extent that did not pose any problem for real use, and "x" represents coloration to the extent unbearable for real use.)

("○" represents no coloration, "Δ" represents coloration within the extent that did not pose any problem for real use, and "x" represents coloration to the extent unbearable for real use.)

The sample cells #41 to #43 displayed good images with coloration being observed in no direction at a viewing angle of 70°. The sample cell #44 displayed good images with coloration being observed in no direction at viewing angles up to 50°, however, displaying slight coloration within the extent that did not pose any problem for real use in the right- and left-hand directions at a viewing angle of 60°. The sample cell #45 displayed slight coloration within the extent that did not pose any problem for real use in the right- and left-hand directions at a viewing angle of 50°.

By contrast, the comparative sample cells #401 to #403 displayed coloration ranging from yellow to orange to the extent unbearable for real use in the right- and left-hand directions at a viewing angle as low as 50°.

The same results were obtained with sample cells and comparative sample cells prepared in the same manner as the sample cells #41 to #45 and the comparative sample cells #401 and #403 except that those sample cells and comparative sample cells included optical retardation compensator plates 2 and 3 composed of discotic liquid crystal treated with hybrid orientation on a transparent support base.

As explained above, the first arrangement of the present invention incorporates, between the liquid crystal layer and the polarizer, an optical retardation compensator plate represented by a refractive index ellipsoid of which the three principal refractive indices, na, nb, and nc, are mutually related by the inequality na=nc>nb, and of which the shorter axis coincident with the principal refractive index nb inclines with respect to the normal direction of the surface of the optical retardation compensator plate. Therefore, with the arrangement, for a case where a linearly polarized ray is converted to an elliptically polarized ray according to the phase difference between the ordinary and extraordinary rays developed from the linearly polarized ray upon the passing through the liquid crystal layer possessing birefringence, the optical retardation compensator plate compensates for the phase difference between the ordinary and extraordinary rays that varies depending upon the viewing angle.

However, the compensation function of this kind still falls short of satisfying the increasing demand for a better restraint in the viewing angle dependency. Bearing that in mind, the inventors of the present invention have conducted further research diligently and found out that the pretilt angle formed by the orientation films and the longer axes of liquid crystal molecules in the liquid crystal layer affects the tone reversion in the opposite viewing direction, especially, when halftone is being displayed by applying to the liquid crystal a voltage that is close to the threshold voltage for the liquid crystal, which has led to the completion of the present invention.

With the liquid crystal display device of the first arrangement in accordance with the present invention, the pretilt angle of the liquid crystal layer sealed in the liquid crystal display element is set within such a range that tone reversion does not occur in the opposite viewing direction when halftone is being displayed by applying to the liquid crystal a voltage that is close to the threshold voltage for the liquid crystal. This can eliminate the tone reversion in the opposite viewing direction on a screen displaying halftone, and thereby further restrain the viewing angle dependency of the screen. The contrast variations and coloration are also restrained better than only by the compensation function by the optical retardation compensator plate.

The inventors have found that the larger the pretilt angles are, the less likely the tone reversion occurs in the opposite viewing direction when halftone is being displayed by applying to the liquid crystal a voltage that is close to the threshold voltage for the liquid crystal. However, the inventors have also found that too large pretilt angles cause an abrupt decrease in luminance in the standard viewing direction when halftone is being displayed. Thus, in the first arrangement above, the abrupt decrease in luminance can be restrained in the standard viewing direction when halftone is being displayed, by further setting the pretilt angle within such a range that luminance does not decrease abruptly in the standard viewing direction when halftone is being displayed by applying to the liquid crystal a voltage that is close to the threshold voltage for the liquid crystal.

Specifically, the range that does not cause tone reversion in the opposite viewing direction when halftone is being displayed by applying to the liquid crystal a voltage that is close to the threshold voltage for the liquid crystal, and that does not cause an abrupt decrease in luminance in the standard viewing direction when halftone is being displayed refers to the setting of the pretilt angle within a range larger than 2° and smaller than 12°.

Although in some instances still incapable of completely eliminating tone reversion in the opposite viewing direction at the viewing angle of 50°, which is the viewing angle typically required for liquid crystal display devices, the setting enables the liquid crystal display device to be viewed in every direction without problems for real use.

The above range, for a case of liquid crystal display devices with wider viewing angles such as 70°, refers to the setting of the pretilt angle within a range not smaller than 4° and not larger than 10°.

The setting enables the liquid crystal display device to be free from tone reversion in the opposite viewing direction at the viewing angle of 70°, which is the viewing angle typically required for the liquid crystal display device with a wider viewing angle, when halftone is being displayed.

For these reasons, with the first arrangement, the contrast ratio in black and white display is not affected by the viewing angle of the observer, and the quality of images displayed by the liquid crystal display device is greatly improved.

As explained above, even if a linearly polarized ray is converted to an elliptically polarized ray according to the phase difference between the ordinary and extraordinary rays developed from the linearly polarized ray upon the passing through the liquid crystal layer possessing birefringence, the second arrangement, similarly to the first arrangement, compensates for the phase difference by the optical retardation compensator plate.

However, the compensation function of this kind still falls short of satisfying the increasing demand for a better restraint in the viewing angle dependency. Bearing that in mind, the inventors of the present invention have conducted further research diligently and found out that the value of applied voltage for displaying halftone obtained by applying to the liquid crystal a voltage that is close to the threshold voltage for the liquid crystal affects the tone reversion in the opposite viewing direction when halftone is being displayed, which has led to the completion of the present invention.

With the liquid crystal display device of the second arrangement in accordance with the present invention, the value of applied voltage for displaying halftone obtained by applying to the liquid crystal a voltage that is close to the threshold voltage for the liquid crystal is set within such a range that tone reversion does not occur in the opposite viewing direction when halftone is being displayed. This can eliminate the tone reversion in the opposite viewing direction with a screen displaying halftone, and thereby further restrain the viewing angle dependency of the screen. The contrast variations and coloration are also restrained better than only by the compensation function by the optical retardation compensator plate.

The voltage for displaying halftone is set in the Normally White mode, as an example, by way of the ratio of the transmittance for the white tone to the transmittance for the OFF state. The inventors have found that the lower the transmittance is, the less likely the tone reversion occurs in the opposite viewing direction when white tone is being displayed. However, the inventors have also found that too low transmittances cause an abrupt decrease in luminance in the standard viewing direction. Thus, in the second arrangement above, the abrupt decrease in luminance can be restrained in the standard viewing direction when halftone is being displayed, by further setting the value of applied voltage for displaying halftone obtained by applying to the liquid crystal a voltage that is close to the threshold voltage for the liquid crystal within such a range that luminance does not decrease abruptly in the standard viewing direction when halftone is being displayed.

Specifically, the range that does not cause tone reversion in the opposite viewing direction when halftone is being displayed by applying to the liquid crystal a voltage that is close to the threshold voltage for the liquid crystal, and that does not cause an abrupt decrease in luminance in the standard viewing direction when halftone is being displayed refers to the setting of the value of applied voltage for displaying halftone obtained by applying to the liquid crystal a voltage that is close to the threshold voltage for the liquid crystal so as to obtain a transmittance higher than 85% that in a bright state (OFF state) where no voltage is applied to the liquid crystal.

Although in some instances still incapable of completely eliminating tone reversion in the opposite viewing direction at the viewing angle of 50°, which is the viewing angle typically required for liquid crystal display devices, the setting enables the liquid crystal display device to be viewed in every direction without problems for real use.

The above range, for a case of liquid crystal display devices with wider viewing angles such as 70°, refers to the setting of the value of applied voltage for displaying halftone obtained by applying to the liquid crystal a voltage that is close to the threshold voltage for the liquid crystal so as to obtain a transmittance within a range not less than 90% and not more than 97% that in a bright state (OFF state) where no voltage is applied to the liquid crystal.

The setting enables the liquid crystal display device to be free from tone reversion in the opposite viewing direction at the viewing angle of 70°, which is the viewing angle typically required for the liquid crystal display device with a wider viewing angle, when halftone is being displayed.

For these reasons, with the arrangement, the contrast ratio in black and white display is not affected by the viewing angle of the observer, and the quality of images displayed by the liquid crystal display device is greatly improved.

As explained above, even if a linearly polarized ray is converted to an elliptically polarized ray according to the phase difference between the ordinary and extraordinary rays developed from the linearly polarized ray upon the passing through the liquid crystal layer possessing birefringence, the arrangement, similarly to the first arrangement, compensates for the phase difference by the optical retardation compensator plate.

However, the compensation function of this kind still falls short of satisfying the increasing demand for a better restraint in the viewing angle dependency. Bearing that in mind, the inventors of the present invention have conducted further research diligently and found out that the ratios of the variation in the refractive index anisotropy, $\Delta n_L$, of the liquid crystal material for the liquid crystal layer with the wavelength of light and of the variation in the refractive index anisotropy, $\Delta n_F$, of the optical retardation compensator plate with the wavelength of light affect the coloration on the liquid crystal screen depending upon the viewing angle, which has led to the completion of the present invention.

With the liquid crystal display device of the third arrangement in accordance with the present invention, the ratios of the variation in the refractive index anisotropy, $\Delta n_L$, of the liquid crystal material for the liquid crystal layer with the wavelength of light and of the variation in the refractive index anisotropy, $\Delta n_F$, of the optical retardation compensator plate with the wavelength of light are set within such a range that viewing angle dependency does not cause coloration on the liquid crystal screen. This can further restrain coloration on the screen. The contrast variations and tone reversion are also restrained better than only by the compensation function by the optical retardation compensator plate.

The range that does not cause coloration on the liquid crystal screen depending upon the viewing angle of the above ratio is the range satisfying the inequality above.

Specifically, as described above, the range refers to the setting of the ratio, $\Delta n_L(450)/\Delta n_L(550)$, of the refractive index anisotropy, $\Delta n_L(450)$, of the liquid crystal material for the liquid crystal layer to light having a wavelength of 450 nm and the refractive index anisotropy, $\Delta n_L(550)$, thereof to light having a wavelength of 550 nm, and the ratio, $\Delta n_F(450)/\Delta n_F(550)$, of the refractive index anisotropy, $\Delta n_F(450)$, of the optical retardation compensator plate to light having a wavelength of 450 nm and the refractive index anisotropy, $\Delta n_F(550)$, thereof to light having a wavelength of 550 nm so as to satisfy the inequality:

$$0 \leq \frac{(\Delta n_L(450)/\Delta n_L(550)) - 1}{(\Delta n_F(450)/\Delta n_F(550)) - 1} < 0.35$$

Alternatively, as described above, the range refers to the setting of the ratio, $\Delta n_L(650)/\Delta n_L(550)$, of the refractive index anisotropy, $\Delta n_L(650)$, of the liquid crystal material for the liquid crystal layer to light having a wavelength of 650 nm and the refractive index anisotropy, $\Delta n_L(550)$, thereof to light having a wavelength of 550 nm, and the ratio, $\Delta n_F(650)/\Delta n_F(550)$, of the optical retardation compensator plate to light having a wavelength of 650 nm and the refractive index anisotropy, $\Delta n_F(550)$, thereof to light having a wavelength of 550 nm so as to satisfy the inequality:

$$0 \le \frac{1-(\Delta n_L(650)/\Delta n_L(550))}{1-(\Delta n_F(650)/\Delta n_F(550))} < 0.27$$

Although in some instances still incapable of completely eliminating coloration at the viewing angle of 50°, which is the viewing angle typically required for liquid crystal display devices, the setting of the ratio to fall within either of the above ranges enables the liquid crystal display device to be viewed in every direction without problems for real use.

The above ranges of the ratio, for a case of liquid crystal display devices with wider viewing angles such as 70°, are preferably the range satisfying the inequality above.

That is, as described above, the range refers to the setting of the ratio so as to satisfy the inequality:

$$0 \le \frac{(\Delta n_L(450)/\Delta n_L(550))-1}{(\Delta n_F(450)/\Delta n_F(550))-1} \le 0.25$$

Alternatively, as described above, the range refers to the setting of the ratio so as to satisfy the inequality:

$$0 \le \frac{1-(\Delta n_L(650)/\Delta n_L(550))}{1-(\Delta n_F(650)/\Delta n_F(550))} \le 0.20$$

The setting described above enables the liquid crystal display device to be completely free from coloration phenomenon for every direction at the viewing angle of 70°, which is the viewing angle typically required for the liquid crystal display device with a wider viewing angle.

Moreover, as described above, in the first, second, and third arrangements, the liquid crystal display device in accordance with the present invention is preferably arranged so that the refractive index anisotropy, $\Delta n_L(550)$, of the liquid crystal material for the liquid crystal layer to light having a wavelength of 550 nm is set within a range larger than 0.060 and smaller than 0.120.

This is because of a confirmation that if the refractive index anisotropy, $\Delta n_L(550)$, of the liquid crystal material to light having a wavelength of 550 nm, which is approximately the mid-range of the visible region of the spectrum, is either not larger than 0.060 or not smaller than 0.120, tone reversion phenomenon and/or a decrease in contrast ratio occur(s) depending upon the viewing direction. Therefore, the phase difference that occurs to the liquid crystal display element in accordance with the viewing angle can be eliminated by setting the refractive index anisotropy, $\Delta n_L(550)$, of the liquid crystal material to light having a wavelength of 550 nm so as to be within a range larger than 0.060 and smaller than 0.120. This can further restrain the contrast variations and tone reversion phenomenon in the right- and left-hand directions, as well as the coloration phenomenon that occurs depending upon the viewing angle.

In such an event the phase difference that occurs to the liquid crystal display element in accordance with the viewing angle can be more effectively eliminated by setting the refractive index anisotropy, $\Delta n_L(550)$, of the liquid crystal material for the liquid crystal layer to light having a wavelength of 550 nm so as to be within a range not smaller than 0.070 and not larger than 0.095. This can surely restrain the contrast variations and tone reversion phenomenon in the right- and left-hand directions of the images displayed by the liquid crystal display device.

Moreover, as described above, in the first, second, and third arrangements, the liquid crystal display device in accordance with the invention is preferably arranged so that the or each optical retardation compensator plate is represented by a refractive index ellipsoid inclining by an inclination angle set within a range of 15° to 75°.

By setting the inclination angle of the refractive index ellipsoid to be within a range of 15° to 75° with respect to the or each optical retardation compensator plate incorporated in the liquid crystal display device, it is assured that the present invention provides the aforementioned compensation function for the phase difference by the optical retardation compensator plate.

Moreover, as described above, in the first, second, and third arrangements, the liquid crystal display device in accordance with the invention is preferably arranged so that the or each optical retardation compensator plate has a product, $(n_a-n_b) \times d$, of the difference between the principal refractive indices, na and nb, and the thickness, d, of the optical retardation compensator plate, the product being set to be from 80 nm to 250 nm.

By setting the product, $(n_a-n_b) \times d$, of the difference between the principal refractive indices, na and nb, and the thickness, d, of the optical retardation compensator plate, so as to be from 80 nm to 250 nm with respect to the or each optical retardation compensator plate incorporated in the liquid crystal display device, it is assured that the present invention provides the aforementioned compensation function for the phase difference by the optical retardation compensator plate.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A liquid crystal display device, comprising:
   a liquid crystal display element formed so that a liquid crystal layer is disposed between a pair of substrates;
   a pair of polarizers disposed so as to flank the liquid crystal display element; and
   at least one optical retardation compensator plate disposed between the liquid crystal display element and the polarizers, said at least one optical retardation compensator plate being represented by an inclining refractive index ellipsoid,
   wherein the ratio, $\Delta n_L(450)/\Delta n_L(550)$, of the refractive index anisotropy, $\Delta n_L(450)$, of the liquid crystal material of the liquid crystal layer to light having a wavelength of 450 nm and the refractive index anisotropy, $\Delta n_L(550)$, thereof to light having a wavelength of 550 nm, and the ratio, $\Delta n_F(450)/\Delta n_F(550)$, of the refractive index anisotropy, $\Delta n_F(450)$, of said at least one optical retardation compensator plate to light having a wavelength of 450 nm and the refractive index anisotropy, $\Delta n_F(550)$, thereof to light having a wavelength of 550 nm satisfy the inequality:

$$0 \le \frac{(\Delta n_L(450)/\Delta n_L(550))-1}{(\Delta n_F(450)/\Delta n_F(550))-1} < 0.35.$$

2. The liquid crystal display device as defined in claim 1, wherein the refractive index ellipsoid of said at least one optical retardation compensator plate has three principal refractive indices, $n_a$, $n_b$, and $n_c$, mutually related by the inequality $n_a=n_c>n_b$, and inclines as the direction of the principal refractive index $n_b$ inclines from the normal direction to the surface of said at least one optical retardation compensator plate around the direction of the principal refractive index $n_a$ or $n_c$ disposed in said surface.

3. The liquid crystal display device as defined in claim 1, wherein $\Delta n_L(450)/\Delta n_L(550)$ and $\Delta n_F(450)/\Delta n_F(550)$ satisfy the inequality:

$$0 \leq \frac{(\Delta n_L(450)/\Delta n_L(550))-1}{(\Delta n_F(450)/\Delta n_F(550))-1} \leq 0.25.$$

4. The liquid crystal display device as defined in claim 1, wherein the ratio, $\Delta n_L$ (650)/$\Delta n_L$ (550), of the refractive index anisotropy, $\Delta n_L$ (650), of the liquid crystal material of the liquid crystal layer to light having a wavelength of 650 nm and the refractive index anisotropy, $\Delta n_L$ (550), thereof to light having a wavelength of 550 nm, and the ratio, $\Delta n_F$ (650)/$\Delta n_F$ (550), of the refractive index anisotropy, $\Delta n_F$ (650), of said at least one optical retardation compensator plate to light having a wavelength of 650 nm and the refractive index anisotropy, $\Delta n_F$ (550), thereof to light having a wavelength of 550 nm satisfy the inequality:

$$0 \leq \frac{(\Delta n_L(650)/\Delta n_L(550))-1}{(\Delta n_F(450)/\Delta n_F(550))-1} < 0.27.$$

5. The liquid crystal display device as defined in claim 4, wherein $\Delta n_L(650)/\Delta n_L(550)$ and $\Delta n_F(650)/\Delta n_F(550)$ satisfy the inequality:

$$0 \leq \frac{1-(\Delta n_L(650)/\Delta n_L(550))}{1-(\Delta n_F(650)/\Delta n_F(550))} \leq 0.20.$$

6. The liquid crystal display device as defined in claim 1, wherein the refractive index anisotropy, $\Delta n_L$ (550), of a liquid crystal material of the liquid crystal layer to light having a wavelength of 550 nm is set within a range larger than 0.060 and smaller than 0.120.

7. The liquid crystal display device as defined in claim 6, wherein $\Delta n_L$ (550) is set within a range larger than 0.070 and smaller than 0.095.

8. The liquid crystal display device as defined in claim 1, wherein the refractive index ellipsoid inclines by an inclination angle set within a range of 15° to 75°.

9. The liquid crystal display device as defined in claim 1, wherein said at least one optical retardation compensator plate has a product $(n_a-n_b) \times d$, of the difference between the principal refractive indices, $n_a$ and $n_b$, and the thickness, d, of the optical retardation compensator plate, the product being set to be from 80 nm to 250 nm.

10. A liquid crystal display device, comprising:
a liquid crystal display element formed so that a liquid crystal layer is disposed between a pair of substrates;
a pair of polarizers disposed so as to flank the liquid crystal display element; and
at least one optical retardation compensator plate disposed between the liquid crystal display element and the polarizers, said at least one optical retardation compensator plate being represented by an inclining refractive index ellipsoid,
wherein the ratio, $\Delta n_L$ (650)/$\Delta n_L$ (550), of the refractive index anisotropy, $\Delta n_L$ (650), of the liquid crystal material of the liquid crystal layer to light having a wavelength of 650 nm and the refractive index anisotropy, $\Delta n_L$ (550), thereof to light having a wavelength of 550 nm, and the ratio, $\Delta n_F$ (650)/$\Delta n_F$ (550), of the refractive index anisotropy, $\Delta n_F$ (650), of said at least one optical retardation compensator plate to light having a wavelength of 650 nm and the refractive index anisotropy, $\Delta n_F$ (550), thereof to light having a wavelength of 550 nm satisfy the inequality:

$$0 \leq \frac{1-(\Delta n_L(650)/\Delta n_L(550))}{1-(\Delta n_F(650)/\Delta n_F(550))} < 0.27.$$

11. The liquid crystal display device as defined in claim 10, wherein the refractive index ellipsoid of said at least one optical retardation compensator plate has three principal refractive indices, $n_a$, $n_b$, and $n_c$, mutually related by the inequality $n_a = n_c > n_b$, and inclines as the direction of the principal refractive index $n_b$ inclines from the normal direction to the surface of said at least one optical retardation compensator plate around the direction of the principal refractive index $n_a$ or $n_c$ disposed in said surface.

12. The liquid crystal display device as defined in claim 10, wherein $\Delta n_L(650)/\Delta n_L(550)$ and $\Delta n_F(650)/\Delta n_F(550)$ satisfy the inequality:

$$0 \leq \frac{1-(\Delta n_L(650)/\Delta n_L(550))}{1-(\Delta n_F(650)/\Delta n_F(550))} \leq 0.20.$$

13. The liquid crystal display device as defined in claim 10, wherein the ratio, $\Delta n_L$ (450)/$\Delta n_L$ (550), of the refractive index anisotropy, $\Delta n_L$ (450), of the liquid crystal material of the liquid crystal layer to light having a wavelength of 450 nm and the refractive index anisotropy, $\Delta n_L$ (550), thereof to light having a wavelength of 550 nm, and the ratio, $\Delta n_F$ (450)/$\Delta n_F$ (550), of the refractive index anisotropy, $\Delta n_F$ (450), of said at least one optical retardation compensator plate to light having a wavelength of 450 nm and the refractive index anisotropy, $\Delta n_F$ (550), thereof to light having a wavelength of 550 nm satisfy the inequality:

$$0 \leq \frac{(\Delta n_L(450)/\Delta n_L(550))-1}{(\Delta n_F(450)/\Delta n_F(550))-1} < 0.35.$$

14. The liquid crystal display device as defined in claim 10, wherein the refractive index anisotropy, $\Delta n_L$ (550), of a liquid crystal material of the liquid crystal layer to light having a wavelength of 550 nm is set within a range larger than 0.060 and smaller than 0.120.

15. The liquid crystal display device as defined in claim 14, wherein $\Delta n_L$ (550) is set within a range larger than 0.070 and smaller than 0.095.

16. The liquid crystal display device as defined in claim 10, wherein the refractive index ellipsoid inclines by an inclination angle set within a range of 15° to 75°.

17. The liquid crystal display device as defined in claim 10, wherein said at least one optical retardation compensator plate has a product $(n_a-n_b) \times d$, of the difference between the principal refractive indices, $n_a$ and $n_b$, and the thickness, d, of the optical retardation compensator plate, the product being set to be from 80 nm to 250 nm.

* * * * *

UNITED STATES PATENT AND TRADEMARK OFFICE
CERTIFICATE OF CORRECTION

PATENT NO. : 6,535,258 B1
DATED : March 18, 2003
INVENTOR(S) : Motoshiro Yamahara It is certified that error appears in the above-identified patent and that said Letters Patent is hereby corrected as shown below:

<u>Title page,</u>
Item [56], U.S. PATENT DOCUMENTS, please add -- 5,844,649  12/1998
Yamahara et al.......... 349/118 --
FOREIGN PATENT DOCUMENTS, please add
-- JA  04-044010  2/1992
   JA  08-050206  2/1996 --

Signed and Sealed this

Twenty-third Day of December, 2003

JAMES E. ROGAN
*Director of the United States Patent and Trademark Office*